US011218679B2

(12) United States Patent
Yoshimura

(10) Patent No.: US 11,218,679 B2
(45) Date of Patent: Jan. 4, 2022

(54) IMAGE PROCESSING DEVICE, IMAGE PROCESSING METHOD, AND IMAGING DEVICE

(71) Applicant: SONY CORPORATION, Tokyo (JP)

(72) Inventor: Shin Yoshimura, Tokyo (JP)

(73) Assignee: SONY CORPORATION, Tokyo (JP)

( * ) Notice: Subject to any disclaimer, the term of this patent is extended or adjusted under 35 U.S.C. 154(b) by 774 days.

(21) Appl. No.: 16/065,537

(22) PCT Filed: Jan. 4, 2017

(86) PCT No.: PCT/JP2017/000011
§ 371 (c)(1),
(2) Date: Jun. 22, 2018

(87) PCT Pub. No.: WO2017/122553
PCT Pub. Date: Jul. 20, 2017

(65) Prior Publication Data
US 2021/0203899 A1    Jul. 1, 2021

(30) Foreign Application Priority Data

Jan. 15, 2016  (JP) ............................... JP2016-006374

(51) Int. Cl.
*H04N 9/64*         (2006.01)
*H04N 5/33*         (2006.01)

(52) U.S. Cl.
CPC ............ *H04N 9/646* (2013.01); *H04N 5/332* (2013.01)

(58) Field of Classification Search
CPC ............................. H04N 9/646; H04N 5/332
See application file for complete search history.

(56) References Cited

U.S. PATENT DOCUMENTS 9,900,485 B2 *  2/2018  Fujita ................... H04N 5/2256
2008/0122933 A1  5/2008  Murayama
(Continued)

FOREIGN PATENT DOCUMENTS

CN      105814887 A    7/2016
JP      2008-008700 A  1/2008
(Continued)

OTHER PUBLICATIONS

International Search Report and Written Opinion of PCT Application No. PCT/JP2017/000011, dated Apr. 4, 2017, 10 pages of ISRWO.

*Primary Examiner* — Mishawn N. Hunter
(74) *Attorney, Agent, or Firm* — Chip Law Group

(57) ABSTRACT

The present technology relates to an image processing device, an image processing method, and an imaging device that enable high-precision image processing. The image processing device generates a high-resolution image obtained from a spectral component of a wavelength band of invisible light, the high-resolution image resolution of which is higher than resolution of an image of a subject obtained from a spectral component of a wavelength band of visible light on the basis of a projection image obtained by projecting light of the wavelength band of the invisible light to the subject. The present technology may be applied to, for example, an image processing device that processes images for viewing purposes and sensing purposes.

18 Claims, 26 Drawing Sheets

SPECTRAL DIFFRACTION OF PROJECTION IMAGE

SPECTRAL DIFFRACTION OF NON-PROJECTION IMAGE

(56) References Cited

U.S. PATENT DOCUMENTS

| | | | |
|---|---|---|---|
| 2009/0244048 A1* | 10/2009 | Yamanaka | G09G 3/3611 345/212 |
| 2009/0244493 A1* | 10/2009 | Aragaki | H04N 9/3182 353/69 |
| 2010/0079477 A1* | 4/2010 | Hasegawa | H04N 9/3185 345/589 |
| 2010/0079478 A1* | 4/2010 | Hasegawa | H04N 9/3105 345/589 |
| 2013/0229526 A1 | 9/2013 | Matsuno et al. | |
| 2013/0342588 A1* | 12/2013 | Yoshimoto | G09G 3/2003 345/690 |
| 2016/0198103 A1 | 7/2016 | Tanaka et al. | |
| 2016/0248953 A1 | 8/2016 | Fujita et al. | |

FOREIGN PATENT DOCUMENTS

| | | |
|---|---|---|
| JP | 2010-147878 A | 7/2010 |
| JP | 2011-233983 A | 11/2011 |
| JP | 2013-211836 A | 10/2013 |
| JP | 2015-222916 A | 12/2015 |
| WO | 2015/104870 A1 | 7/2015 |
| WO | 2015/178012 A1 | 11/2015 |

\* cited by examiner

EXAMPLE OF ARTIFACT

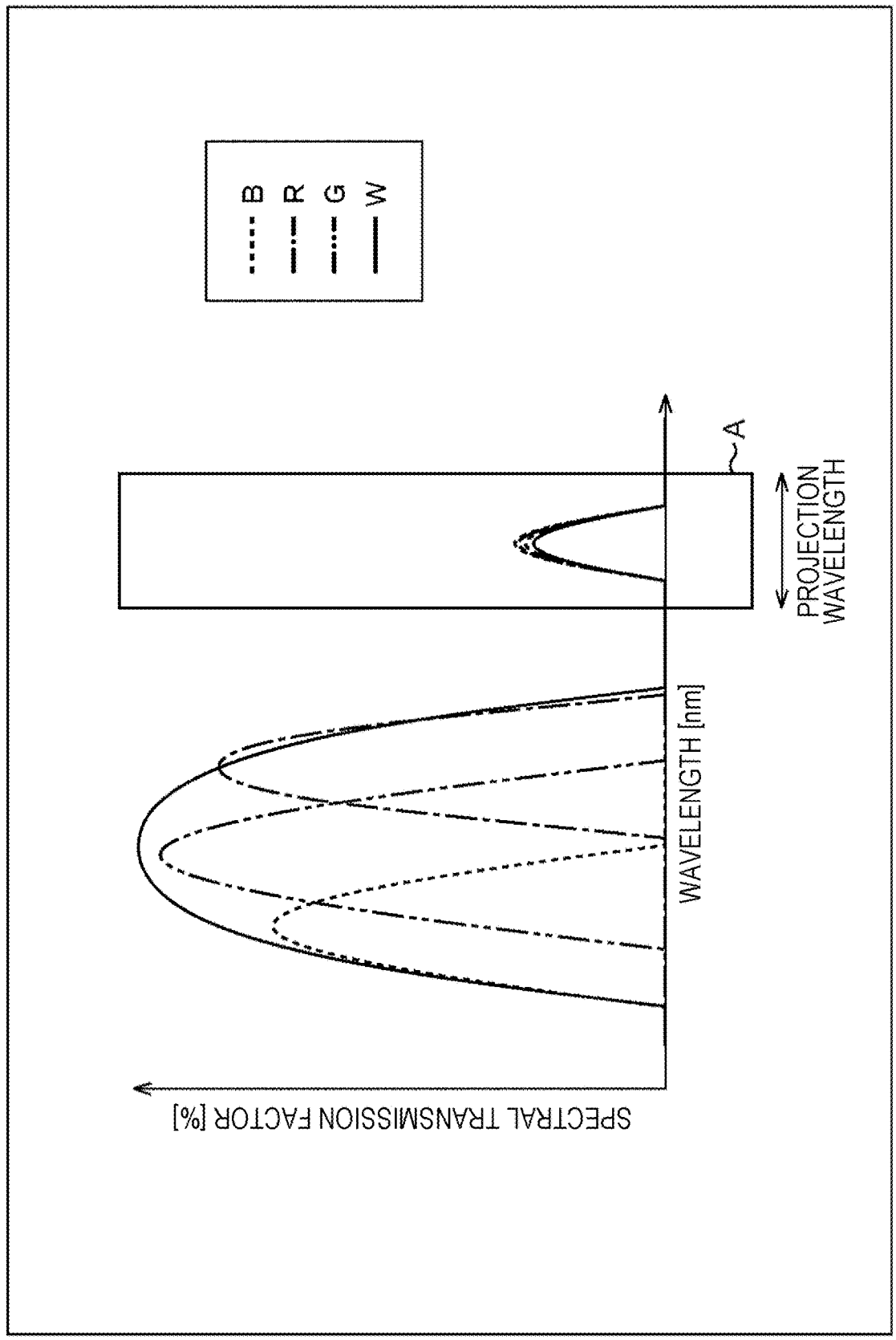

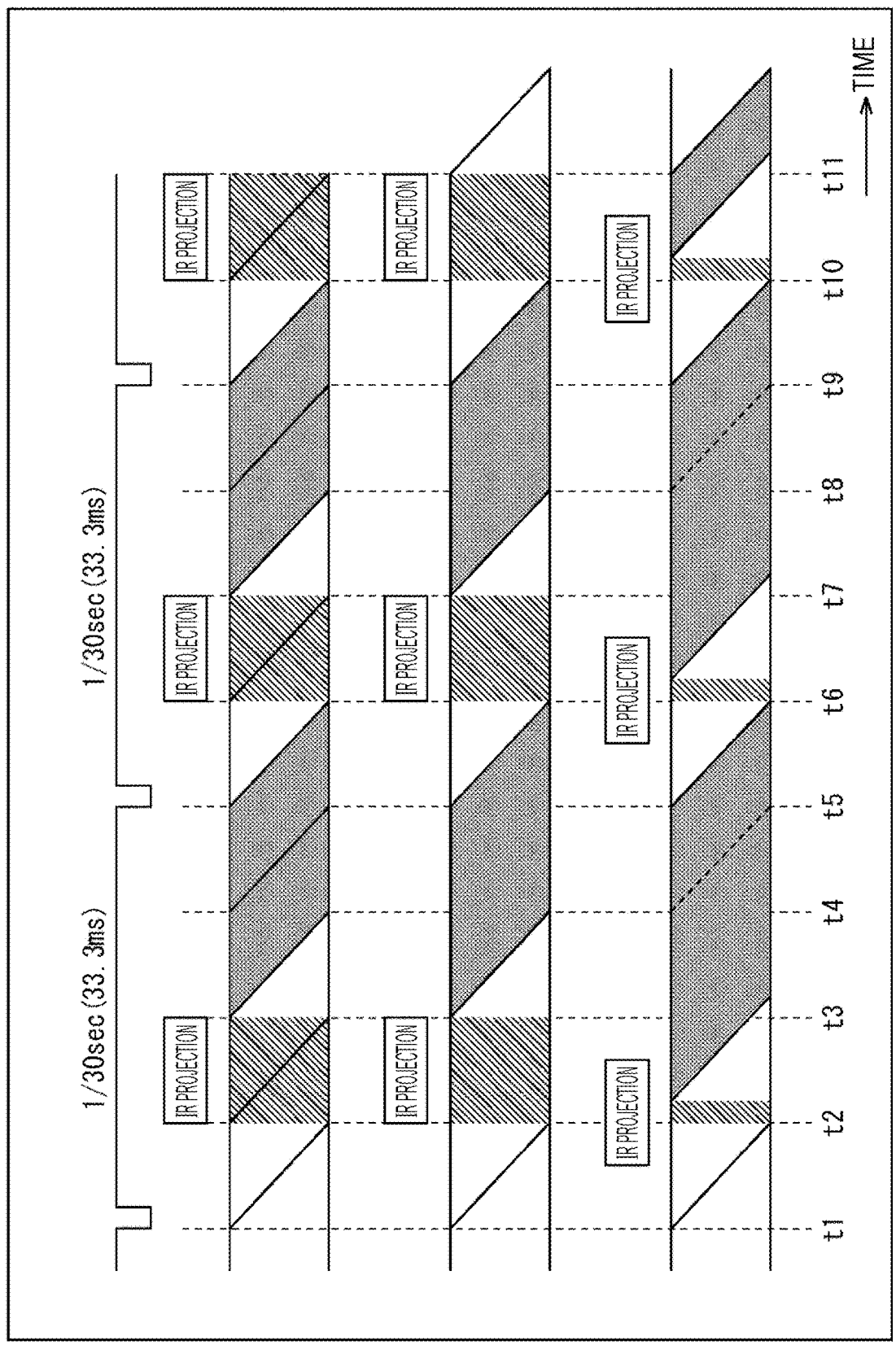

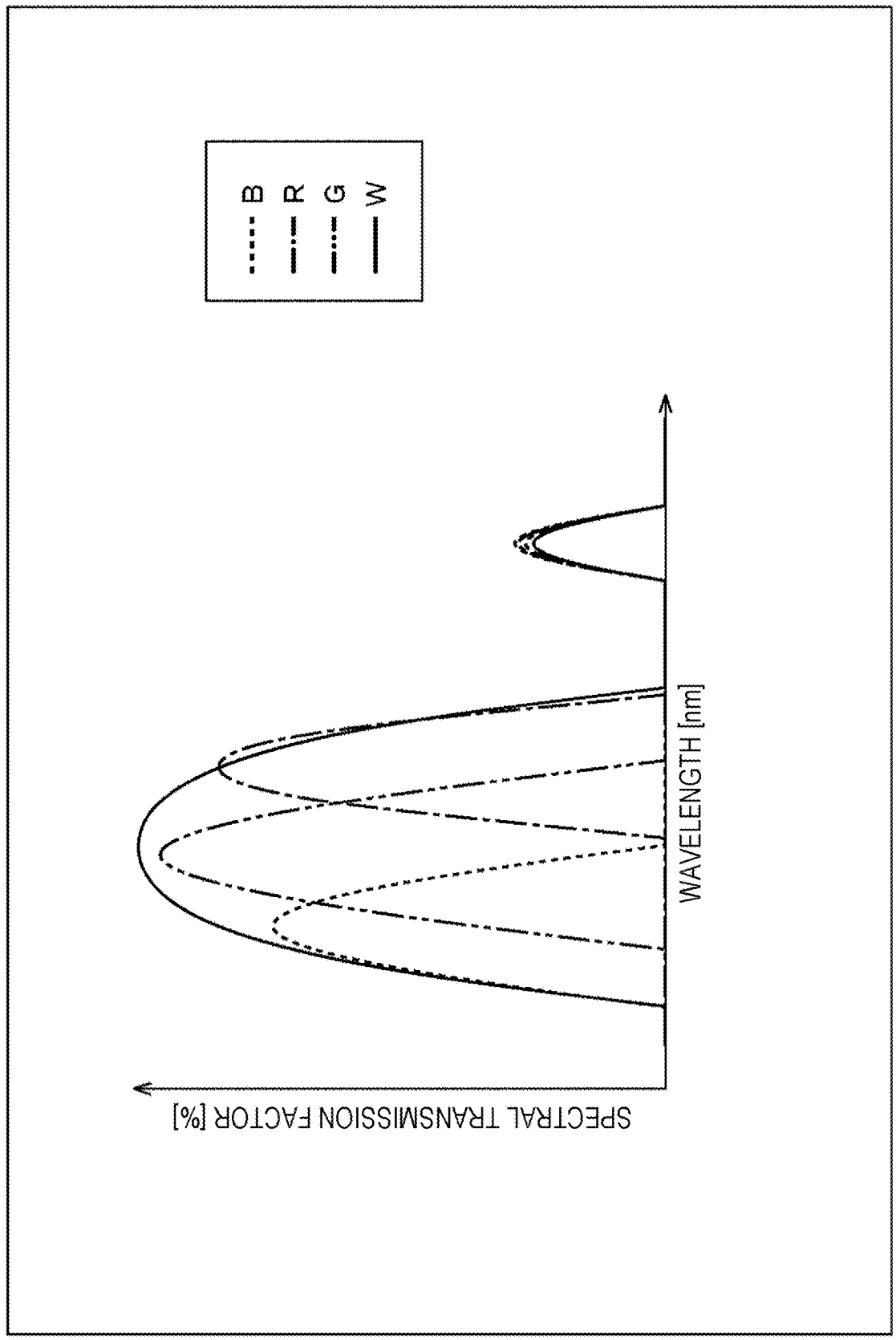

SPECTRAL DIFFRACTION OF PROJECTION IMAGE

SPECTRAL DIFFRACTION OF NON-PROJECTION IMAGE

SPECTRAL DIFFRACTION OF PURE PROJECTION IMAGE

COLOR FILTER-SPECIFIC SENSITIVITY DEVIATION CORRECTION
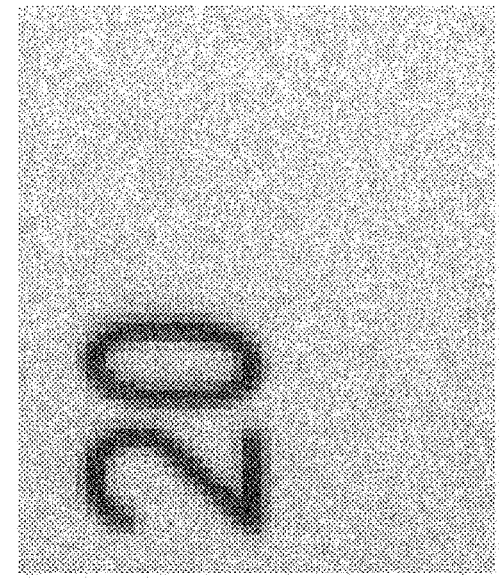
FIG. 10A
BEFORE COLOR FILTER-SPECIFIC GAIN PROCESSING
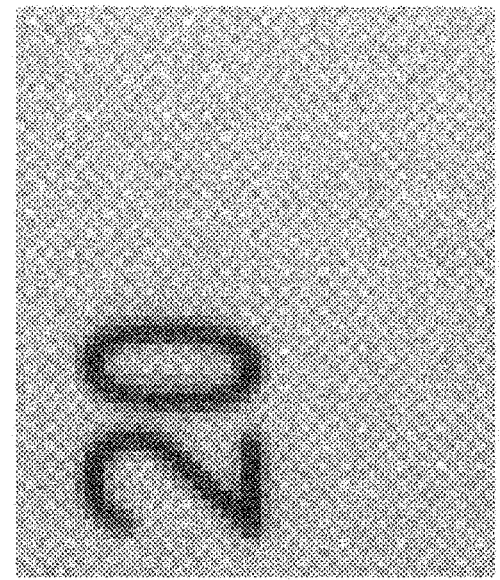
FIG. 10B
AFTER COLOR FILTER-SPECIFIC GAIN PROCESSING

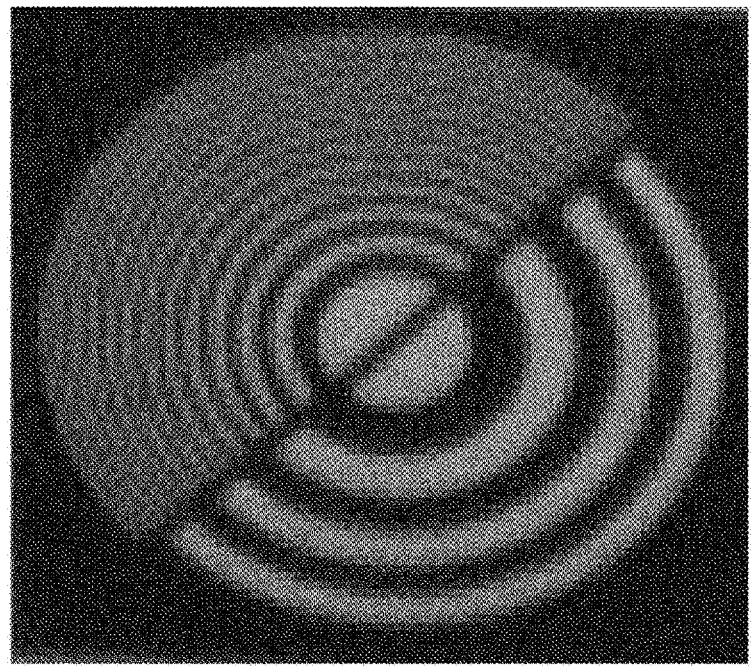
FIG. 18B  PRESENT TECHNOLOGY
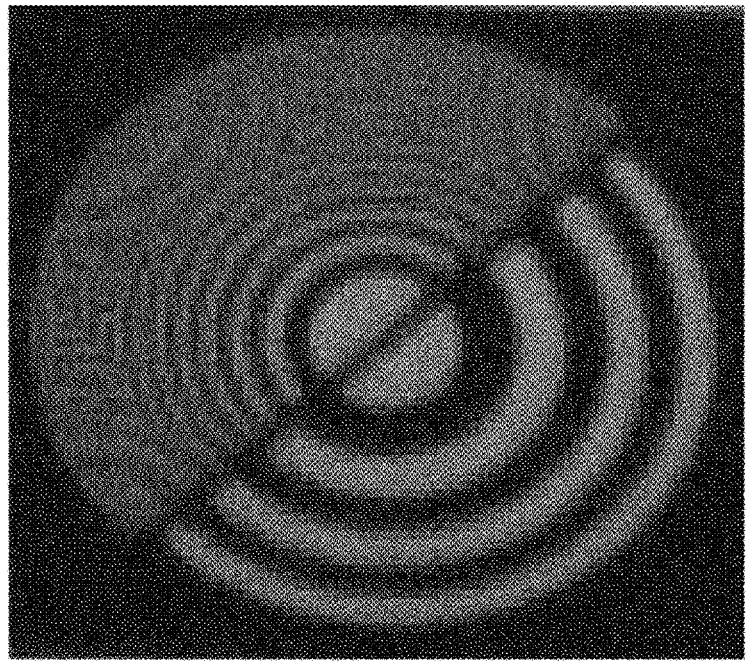
FIG. 18A  CONVENTIONAL TECHNOLOGY

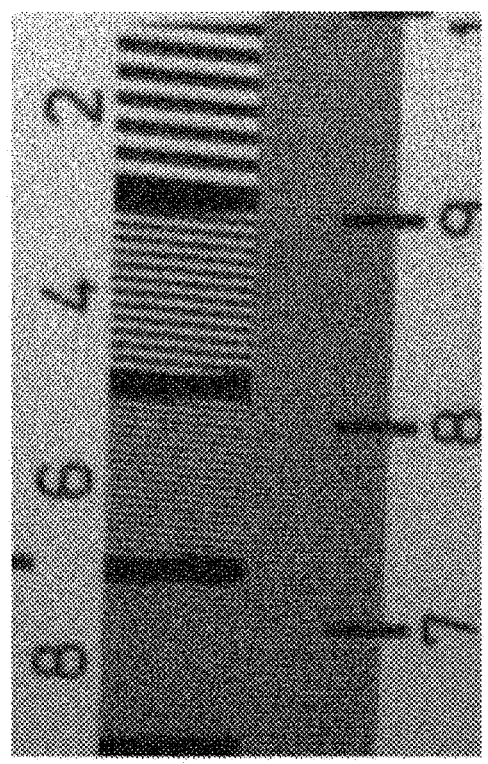
FIG. 19A  CONVENTIONAL TECHNOLOGY
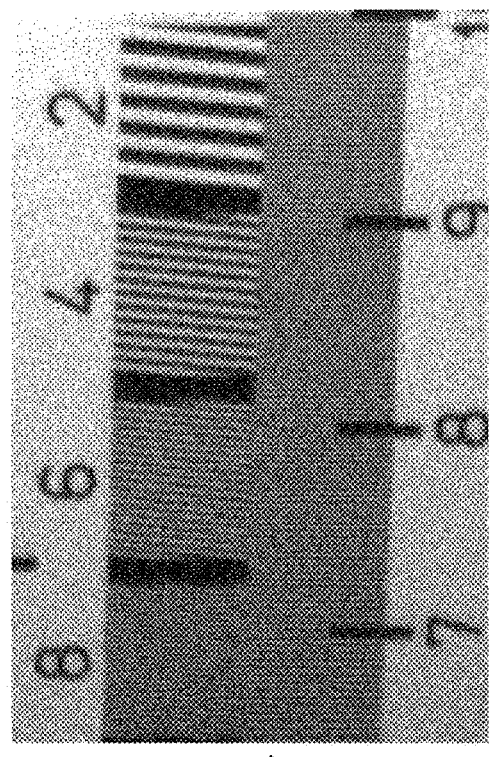
FIG. 19B  PRESENT TECHNOLOGY

IMAGE PROCESSING DEVICE, IMAGE PROCESSING METHOD, AND IMAGING DEVICE

CROSS REFERENCE TO RELATED APPLICATIONS

This application is a U.S. National Phase of International Patent Application No. PCT/JP2017/000011 filed on Jan. 4, 2017, which claims priority benefit of Japanese Patent Application No. JP 2016-006374 filed in the Japan Patent Office on Jan. 15, 2016. Each of the above-referenced applications is hereby incorporated herein by reference in its entirety.

TECHNICAL FIELD

The present technology relates to an image processing device, an image processing method, and an imaging device, and especially relates to an image processing device, an image processing method, and an imaging device which enable high-precision image processing.

BACKGROUND ART

Conventionally, a method of performing image processing using not only an image signal by visible light but also an image signal by infrared light is proposed (refer to, for example, Patent Document 1).

Herein, in a field of image processing, a false color is known in which a color which is not actually present is reproduced. Even in the method proposed in Patent Document 1, it is impossible to avoid occurrence of the false color in principle. Also, depending on the image processing, there is a case where an artifact in which a pattern different from an actual pattern appears occurs in the processed image.

CITATION LIST

Patent Document

Patent Document 1: Japanese Patent Application Laid-Open No. 2011-233983

SUMMARY OF THE INVENTION

Problems to be Solved by the Invention

By the way, when the false color and the artifact occur, they give a sense of discomfort to a user who looks at the image, and it is supposed to be a cause of deterioration in sensing performance in recently developed sensing purposes. Therefore, a technology of enabling high-precision image processing for suppressing occurrence of the false color, the artifact and the like is demanded.

The present technology is achieved in view of such a situation, and an object thereof is to perform high-precision image processing.

Solutions to Problems

An image processing device according to a first aspect of the present technology is an image processing device provided with an image generation unit which generates a high-resolution image obtained from a spectral component of a wavelength band of invisible light, the high-resolution image resolution of which is higher than resolution of an image of a subject obtained from a spectral component of a wavelength band of visible light on the basis of a projection image obtained by projecting light of the wavelength band of the invisible light to the subject.

The image processing device according to the first aspect of the present technology may be an independent device or may be an internal block which forms one device. Also, an image processing method according to the first aspect of the present technology is an image processing method corresponding to the image processing device according to the first aspect of the present technology described above.

In the image processing device and the image processing method according to the first aspect of the present technology, a high-resolution image obtained from a spectral component of a wavelength band of invisible light is generated, the high-resolution image resolution of which is higher than resolution of an image of a subject obtained from a spectral component of a wavelength band of visible light on the basis of a projection image obtained by projecting light of the wavelength band of the invisible light to the subject.

An imaging device according to a second aspect of the present technology is an imaging device provided with an imaging element including color filters having a uniform spectral characteristic on an invisible light side of each color which images a subject, a light projection unit which projects light of a projection wavelength corresponding to the spectral characteristic on the invisible light side of the color filters to the subject, and an image generation unit which generates a high-resolution image obtained from a spectral component of a wavelength band of the invisible light, the high-resolution image resolution of which is higher than resolution of an image of the subject obtained from a spectral component of a wavelength band of visible light on the basis of a projection image obtained by projecting the light of the projection wavelength to the subject.

In the imaging device according to the second aspect of the present technology, the subject is imaged, the light of the projection wavelength including a wavelength band corresponding to the spectral characteristic on the invisible light side of the color filters having the uniform spectral characteristic on the invisible light side of the color filters of the imaging element is projected to the subject, and a high-resolution image obtained from a spectral component of a wavelength band of the invisible light is generated, the high-resolution image resolution of which is higher than resolution of an image of the subject obtained from a spectral component of a wavelength band of visible light on the basis of a projection image obtained by projecting the light of the projection wavelength to the subject.

The imaging device according to the second aspect of the present technology may be an independent device or may be an internal block which forms one device.

Effects of the Invention

According to the first and second aspects of the present technology, high-precision image processing becomes possible.

Meanwhile, the effects are not necessarily limited to the effects herein described and may include any of the effects described in the present disclosure.

BRIEF DESCRIPTION OF DRAWINGS

FIG. 4 is a view illustrating an example of a projection wavelength of light projected by a light projector.

FIGS. 5A, 5B, and 5C are timing charts illustrating a projection timing of the light projected by the light projector.

FIG. 7 is a view illustrating an example of spectral characteristics of a color filter of the imaging element.

FIGS. 10A and 10B are views illustrating an outline of color filter-specific sensitivity deviation correction processing.

FIGS. 18A and 18B are views illustrating an example of artifact removal in the full-resolution image.

FIGS. 19A and 19B are views illustrating an example of the artifact removal in the full-resolution image.

MODE FOR CARRYING OUT THE INVENTION

An embodiment of the present technology is hereinafter described with reference to the drawings. Meanwhile, the description is given in the following order.

1. Principle of False Color and Artifact
2. Configuration of System
(1) Entire Configuration
(2) Light Projecting Operation by Light Projector 102
(3) Detailed Configuration of Imaging Element 103
(4) Detailed Configuration of Full-Resolution Image Generation Unit 105
(5) Detailed Configuration of Signal Processing Unit 106
3. Processing Flow
4. Variation
5. Configuration of Computer <1. Principle of False Color and Artifact>

Figure 1:
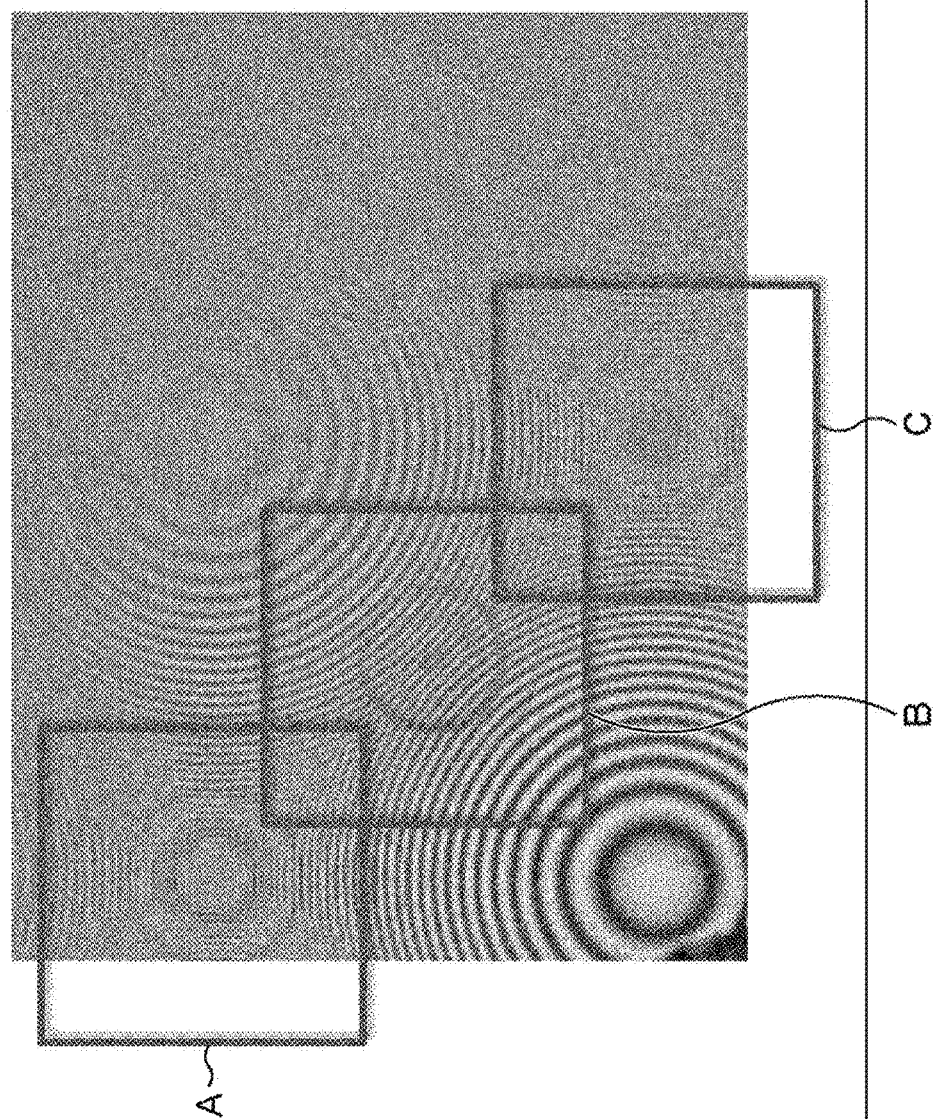
FIG. 1 is a view illustrating an example of a false color.

As described above, there is a case where a false color in which a color which is not actually present is reproduced occurs in an image subjected to predetermined image processing. FIG. 1 is a view illustrating an example of the false color. In FIG. 1, the color which is not actually present is reproduced in areas enclosed by a frame A, a frame B, and a frame C.

Figure 2:
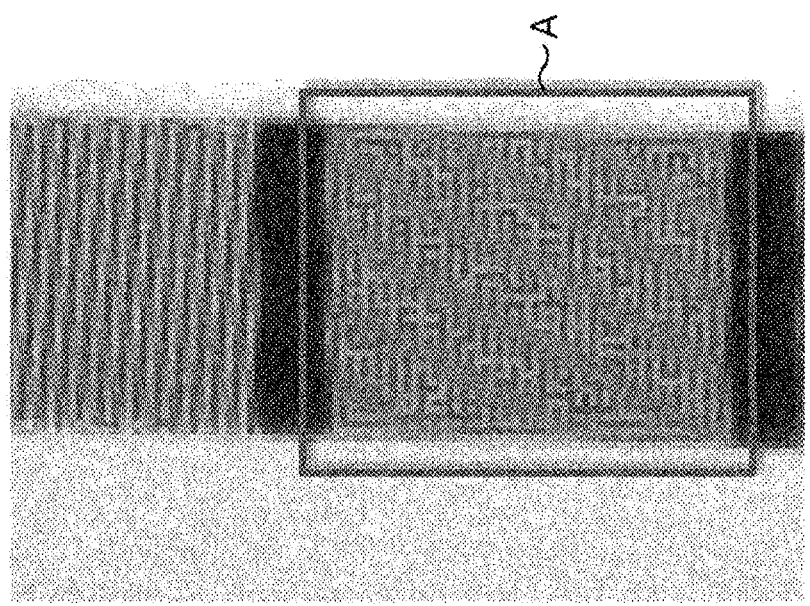
FIG. 2 is a view illustrating an example of an artifact.

Also, depending on the image processing, there is a case where an artifact in which a pattern different from an actual pattern appears occurs in the processed image. FIG. 2 is a view illustrating an example of the artifact. In FIG. 2, the pattern different from the actual pattern appears in an area enclosed by a frame A.

When such false color and artifact occur, they give a sense of discomfort to a user who looks at the image, and in recently developed sensing purposes, they become a factor of deteriorating a sensing performance, so that it is necessary to suppress the occurrence of the false color and the artifact.

Therefore, in the present technology, a high-precision image processing method for suppressing occurrence of the false color illustrated in FIG. 1 and the artifact illustrated in FIG. 2 is suggested. Hereinafter, the image processing method for suppressing the occurrence of the false color and the artifact according to the present technology is described.

<2. Configuration of System>

(1) Entire Configuration (Configuration Example of Imaging Device)

Figure 3:
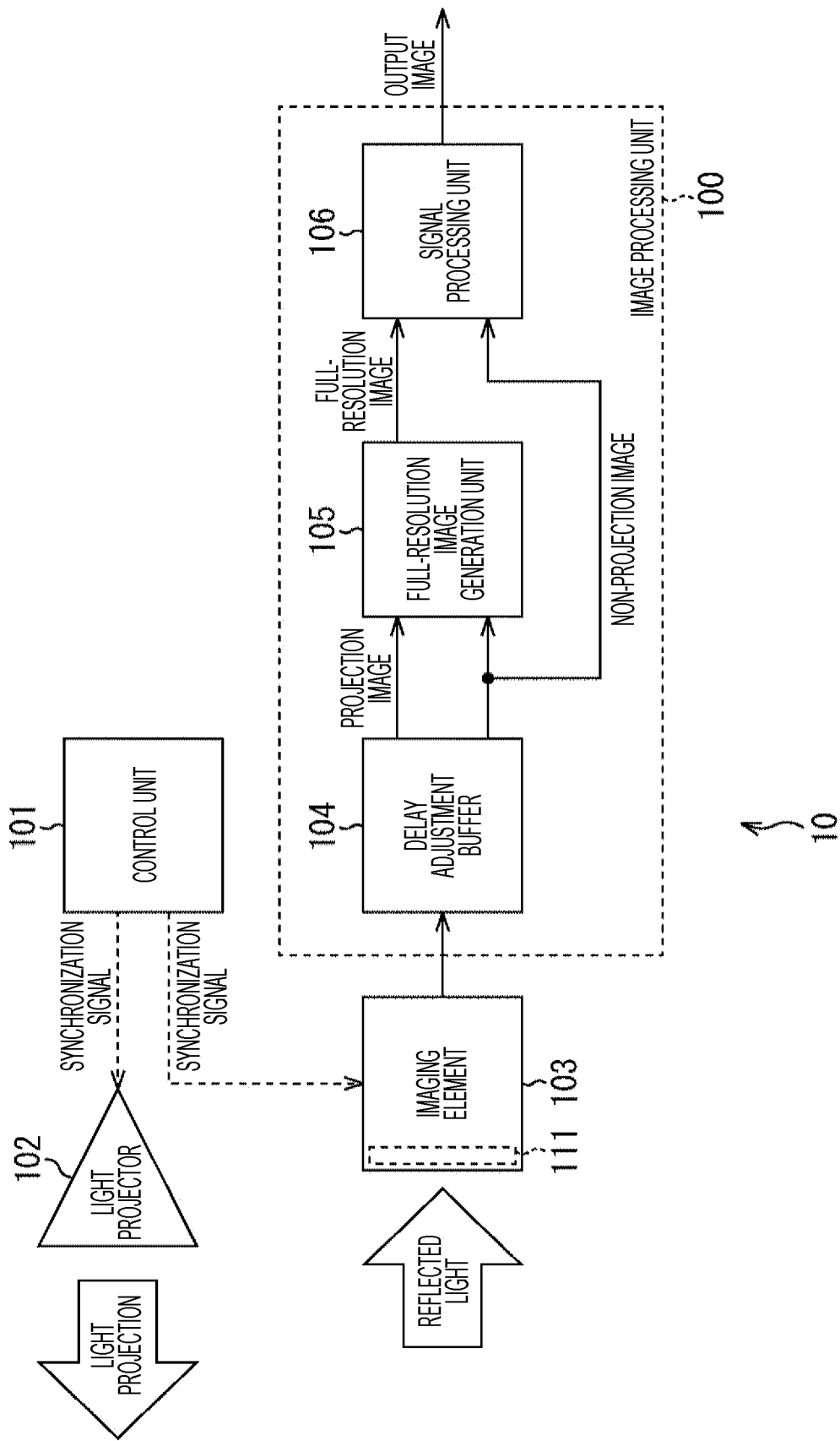
FIG. 3 is a view illustrating a configuration of one embodiment of an imaging device to which the present technology is applied.

FIG. 3 is a view illustrating a configuration of an embodiment of an imaging device to which the present technology is applied.

An imaging device 10 is an electronic device having an imaging function such as a digital still camera, a digital video camera, a smartphone, a mobile phone, a tablet terminal device and the like, for example.

In FIG. 3, the imaging device 10 includes a control unit 101, a light projector 102, an imaging element 103, a delay adjustment buffer 104, a full-resolution image generation unit 105, and a signal processing unit 106. In addition, the delay adjustment buffer 104, the full-resolution image generation unit 105, and the signal processing unit 106 form an image processing unit 100.

The control unit 101 controls operation of each unit of the imaging device 10. Also, the control unit 101 generates a synchronization signal for synchronizing light projecting operation by the light projector 102 and imaging operation by the imaging element 103, and outputs the same to the light projector 102 and the imaging element 103.

In accordance with the synchronization signal from the control unit 101, the light projector 102 projects blinking light of a wavelength (hereinafter referred to as a projection wavelength) band with uniform spectral characteristics on an invisible light side of respective color filters in synchronization with the imaging element 103. The projection wavelength includes a wavelength band different from that of visible light (wavelength band of invisible light) such as a wavelength of infrared light (IR light), for example. Meanwhile, the light projecting operation by the light projector 102 is described in detail later with reference to FIGS. 4, 5A, 5B and 5C.

The imaging element 103 receives light reflected from a subject (reflected light), converts the light into an electric signal, and generates an image signal. An image sensor such as a charge coupled device (CCD) image sensor and a complementary metal oxide semiconductor (CMOS) image sensor may be used, for example, as the imaging element 103.

The imaging element 103 is provided with a color filter 111 of respective colors corresponding to a plurality of pixels arrayed in a two-dimensional lattice pattern. For example, in the color filter 111, color filters of respective colors of red (R), green (G), blue (B), and white (W) are two-dimensionally arrayed. In the imaging element 103, an R pixel, a G pixel, a B pixel, and a W pixel corresponding to the respective color filters (R, G, B, and W filters) of the color filter 111 are arrayed in a two-dimensional lattice pattern.

In the imaging element 103, an analog electric signal photoelectrically converted by each of these pixels is subjected to analog to digital (A/D) conversion, a digital signal is generated as a pixel signal for each pixel, and an image signal including the pixel signals is generated.

Also, the imaging element 103 performs the imaging operation in synchronization with the light projector 102 according to the synchronization signal from the control unit 101. Herein, since the light projector 102 projects the blinking light of the wavelength band of the invisible light (for example, the infrared light), in the imaging element 103, the image signals of an image obtained when the light projector 102 is turned on (hereinafter referred to as a projection image) and an image obtained when the light projector 102 is turned off (hereinafter referred to as a non-projection image) are generated.

In the imaging element 103, (the image signals of) the projection image and the non-projection image are alternately generated in accordance with the synchronization signal from the control unit 101 to be sequentially output to (the delay adjustment buffer 104 of) the image processing unit 100. Meanwhile, a detailed configuration of the imaging element 103 is described later with reference to FIGS. 6A 6B, 6C, 6D, 6E, and 7.

Also, in the imaging element 103, it is necessary to generate the image signal corresponding to the light of the wavelength band of the invisible light (for example, infrared light), so that it is not necessary to provide a filter (for example, an IR cut filter) for cutting the light of the wavelength band of the invisible light provided on a normal camera.

In the image processing unit 100, (the image signals of) the projection image and the non-projection image generated by the imaging element 103 are sequentially written in the delay adjustment buffer 104. The delay adjustment buffer 104 holds at least one of the projection image and the non-projection image written therein, thereby matching processing timings of the projection image and the non-projection image which should be processed at the same time.

The projection image and the non-projection image the timings of which are matched in this manner are simultaneously read out by the full-resolution image generation unit 105 on a subsequent stage. Also, the non-projection image out of the projection image and the non-projection image which are read out at the same time is supplied to the signal processing unit 106. However, as is described later, the projection image may be supplied to the signal processing unit 106 in place of the non-projection image.

The full-resolution image generation unit 105 processes the projection image and the non-projection image simultaneously read out from the delay adjustment buffer 104 to generate a high-resolution image (hereinafter referred to as a full-resolution image) obtained from a spectral component of the wavelength band of the invisible light having the resolution higher than that of the image of the subject obtained from a spectral component of the wavelength band of the visible light, and supplies the same to the signal processing unit 106.

Herein, in the full-resolution image generation unit 105, for example, an image of only a projection component may be obtained by taking a difference between (the spectral component of) the projection image and (the spectral component of) the non-projection image, so that this image may be made the full-resolution image. That is, the projection image and the non-projection image are images obtained when the light projector 102 projects the blinking light using the wavelength band in which the spectral characteristics of the respective color filters (R, G, B, and W filters) of the color filter 111 are uniform in the wavelength band of the invisible light (for example, the infrared light band) as the projection wavelength, so that the full-resolution image is generated by the pixel signal obtained from the light (infrared light) passing through the filters of all colors in the color filter 111.

Then, the full-resolution image generated in this manner is an image with higher resolution than the image for each color component of the respective color filters (for example, an image corresponding to the pixel signals of R, G, B, and W). Meanwhile, a detailed configuration of the full-resolution image generation unit 105 is described later with reference to FIGS. 8, 9A, 9B, 9C, 10A, 10B, 11 and 12.

The non-projection image read out from the delay adjustment buffer 104 and the full-resolution image output from the full-resolution image generation unit 105 are input to the signal processing unit 106 at the same time. Herein, the non-projection image used for generating the full-resolution image is input simultaneously with the full-resolution image.

The signal processing unit 106 processes the non-projection image on the basis of the full-resolution image to generate an output image and outputs the same to a circuit (not illustrated) on a subsequent stage. For example, the output image may be a (high-resolution) color image for viewing purposes.

Herein, in the signal processing unit 106, the occurrence of the artifact may be suppressed by using not a luminance image (luminance signal) obtained from the non-projection image but the full-resolution images. Also, the signal processing unit 106 performs processing for suppressing the occurrence of the false color on the color image obtained from the non-projection image using the full-resolution image. Therefore, the output image output from the signal processing unit 106 is an image in which the occurrence of the false color and the artifact is suppressed. Meanwhile, a detailed configuration of the signal processing unit 106 is described later with reference to FIGS. 13 to 15.

The imaging device 10 is configured in the above-described manner.

Meanwhile, although it is described that the image processing unit 100 includes the delay adjustment buffer 104, the full-resolution image generation unit 105, and the signal processing unit 106 in the configuration in FIG. 3, the image processing unit 100 may also be regarded as a separate device. That is, the image processing unit 100 may be an image processing device including the delay adjustment buffer 104, the full-resolution image generation unit 105, and the signal processing unit 106. However, in this image processing device, the delay adjustment buffer 104 is not indispensable, and it suffices that the projection image and the non-projection image which should be processed simultaneously are input to the full-resolution image generation unit 105 at a predetermined timing.

Next, with reference to FIGS. 4, 5A, 5B, 5C, 6A, 6B, 6C, 6D, 6E, 7, 8, 9A, 9B, 9C, 10A, 10B, 11, 12, 13, 14, and 15, detailed processing contents of each unit forming the imaging device 10 in FIG. 3 are described.

(2) Light Projecting Operation by Light Projector 102

First, with reference to FIGS. 4, 5A, 5B, and 5C, the light projecting operation by the light projector 102 in FIG. 3 is described.

(Example of Projection Wavelength)

FIG. 4 is a view illustrating an example of the projection wavelength of the light (infrared light) projected by the light projector 102. In FIG. 4, a wavelength A (nm) is plotted along the abscissa; a value thereof increases from a left side toward a right side in the drawing. Also, a spectral transmission factor (%) (spectral characteristic) of the respective color filters (R, G, B, and W filters) of the color filter 111 of the imaging element 103 is plotted along the ordinate.

In FIG. 4, the B filter out of the color filter 111 transmits light on a short wavelength side. Herein, the short wavelength is a wavelength band of, for example, 450 to 500 nm, 400 to 500 nm and the like. Also, the G filter out of the color filter 111 transmits light of a medium wavelength. Herein, the medium wavelength is a wavelength band of 500 to 600 nm or the like, for example. Furthermore, the R filter out of the color filter 111 transmits light on a long wavelength side. Herein, the long wavelength is a wavelength band of 600 to 650 nm, 550 to 650 nm and the like, for example.

Also, in the color filter 111, the W filter transmits light (visible light) of a wavelength band of 380 to 650 nm and the like. In contrast, in the respective color filters (R, G, B, and W filters) of the color filter 111, the spectral characteristics on the invisible light side, that is, around 850 nm of the infrared light having the wavelength longer than that of the visible light are similar (rectangular frame A in the drawing). That is, in the color filter 111, the spectral characteristics of the R filter, the G filter, the B filter, and the W filter are uniform in a band other than the visible light (band of the infrared light).

The light projector 102 allows the infrared light of the wavelength band around 850 nm as the projection wavelength to be projected in accordance with the spectral characteristic of the respective color filters of the color filter 111. For example, the light projector 102 may generate a wavelength band in which the spectral characteristics are uniform by a filter (for example, an IR band pass filter) which transmits the light of the wavelength band of the invisible light, and further project the infrared light limited to the wavelength band. Meanwhile, if an object is simply to obtain the full-resolution image, the IR band pass filter is not necessary and it suffices to project light limited to a wavelength in which the spectral characteristics are uniform.

(Example of Projection Timing)

FIGS. 5A, 5B, and 5C are timing charts illustrating a projection timing of the light (infrared light) projected by the light projector 102. Meanwhile, in FIGS. 5A 5B, and 5C, a time direction is a direction from a left side toward a right side of the drawing.

In FIGS. 5A, 5B, and 5C, three types of projection timing are illustrated by the timing charts in FIGS. 5A, 5B, and 5C. However, it is assumed that a timing of the light projection by the light projector 102 and a timing of exposure of the imaging element 103 are synchronized by the synchronization signal from the control unit 101.

In the imaging element 103, an exposure period and a readout period (of charge) are repeated at intervals of 1/30 second (33.3 milliseconds) such as from time t1 to time t5 and from time t5 to time t9. In contrast, the light projector 102 projects the (blinking) infrared light (light of the wavelength band of the projection wavelength) so as to coincide with the exposure timing of the imaging element 103.

Therefore, in the timing charts in FIGS. 5A, 5B, and 5C, if the exposure period is represented by a white portion (a portion not shaded) in the drawing and the readout period is represented by a shaded portion in the drawing, the period in which the light projector 102 projects the infrared light (a hatched area corresponding to "IR projection" in the drawing) is within the exposure period.

In this manner, by projecting the (blinking) infrared light in the exposure period, the subject when the light projector 102 is turned on and the subject when the light projector 102 is turned off are alternately imaged. Herein, it is preferable that a time lag between turn-on (on) and turn-off (off) of the light projector 102 is as small as possible; however, for example, by turning on and off the light projector 102 at a high speed in 1/30 second (33.3 milliseconds) and adding to accumulate signals obtained at the respective timings in different memory units (buffers), the time lag between turn-on and turn-off the light projector 102 may be minimized.

Meanwhile, in the imaging element 103 in which a plurality of pixels is two-dimensionally arrayed, so-called global exposure is realized by starting the exposure simultaneously for all pixels, finishing the exposure simultaneously for all pixels, and sequentially transferring the charges accumulated in a photodiode to the memory unit and a floating diffusion area. With this global exposure, the imaging with the same exposure period for all the pixels becomes possible, so that occurrence of so-called focal plane distortion may be suppressed.

As described above, since the timing of the light projection by the light projector 102 and the timing of the exposure by the imaging element 103 are synchronized with each other, the imaging element 103 alternately generates (the image signal of) the projection image obtained when the light projector 102 is turned on and (the image signal of) the non-projection image obtained when the light projector 102 is turned off.

Meanwhile, the timing of the light projection by the light projector 102 illustrated in the timing chart in FIGS. 5A, 5B, and 5C is merely an example, and the infrared light may be projected from the light projector 102 at other timings.

(3) Detailed Configuration of Imaging Element 103

Next, with reference to FIGS. 6A, 6B, 6C, 6D, 6E, and 7, a more detailed configuration of the imaging element 103 in FIG. 3 is described.

(Example of Array of Color Filters)

FIGS. 6A, 6B, 6C, 6D, and 6E are views illustrating an example of array of the respective color filters of the color filter 111 of the imaging element 103.

As illustrated in FIGS. 6A, 6B, 6C, 6D, and 6E, the color filter 111 includes at least the R filter, the G filter, and the B filter, and may also include the W filter or an IR filter; these filters are arrayed according to a predetermined rule. Meanwhile, in this embodiment, a case where the R filter, the G filter, the B filter, and the W filter are arrayed as the color filter 111 is mainly described.

(A) First Color Array

Figure 6C:
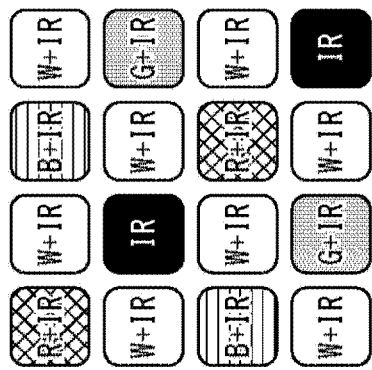
FIGS. 6A, 6B, 6C, 6D, and 6E are views illustrating an example of a color filter array of an imaging element.
Figure 6B:
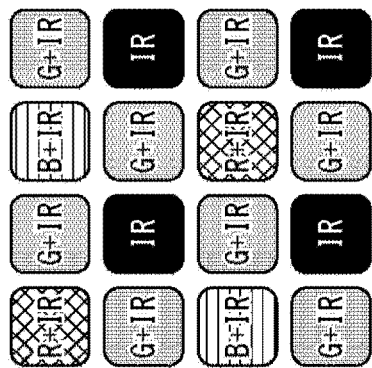
Figure 6E:
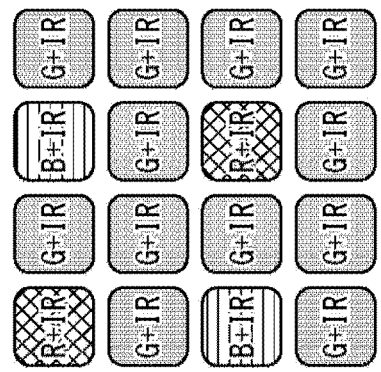
Figure 6A:
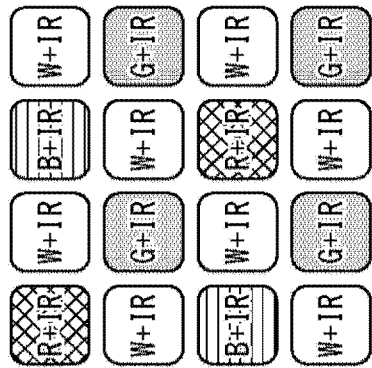

In the color filter 111 in FIG. 6A, a first row including the R filter, the W filter, and the B filter and a second row including the W filter and the G filter are alternately arrayed in a column direction thereof, and in the first row, the R filter and the B filter are alternately arrayed.

Herein, as illustrated in the spectral characteristics of the color filter 111 in FIG. 7, not only the light of the respective color components but also the infrared light projected from the light projector 102 are transmitted in the respective color filters (R, G, B, and W filters). That is, as described above, since the infrared light of the wavelength band around 850 nm, for example, is projected in accordance with the spectral characteristics (FIG. 7) of the respective color filters (R, G, B, and W filters) in the light projector 102, so that in the imaging element 103, the infrared light from the light projector 102 may be transmitted by the respective color filters (R, G, B, and W filters) in which the spectral characteristics are uniform.

As a result, in the color filter 111 in FIG. 6A, pixel signals of R and IR may be obtained from light (red light and infrared light) transmitted through the R filter ("R+IR" in the drawing). Similarly, pixel signals of G and IR may be obtained from light (green light and infrared light) transmitted through the G filter ("G+IR" in the drawing).

Also, pixel signals of B and IR may be obtained from light (blue light and infrared light) transmitted through the B filter ("B+IR" in the drawing). Similarly, pixel signals of W and IR may be obtained from light (white light and infrared light) transmitted through the W filter ("W+IR" in the drawing).

In this manner, by adopting the array in FIG. 6A as the color filter 111, in the imaging element 103, it becomes possible to generate the pixel signal of the component of the infrared light obtained from all the pixels (spectral component of the wavelength band of the invisible light) together with the pixel signals of the respective color components (spectral component of the wavelength band of the visible light) obtained from the pixels corresponding to the respective color filters (R, G, B, and W filters) of the color filter 111. Then, since the pixel signal of the component of the infrared light is a pixel signal obtained from all the pixels two-dimensionally arrayed by the imaging element 103, the image signal generated including this pixel signal is the high-resolution image.

(B) Second Color Array

In the color filter 111 in FIG. 6B, a first row including the R filter, the G filter, and the B filter and a second row including the G filter and the IR filter are alternately arrayed in a column direction thereof, and in the first row, the R filter and the B filter are alternately arrayed.

In the color filter 111 in FIG. 6B, as in the case of the first color array (FIG. 6A), since the respective color filters have the spectral characteristics illustrated in FIG. 7, the infrared light from the light projector 102 is transmitted together with the light of the respective color components. However, in the IR filter, the visible light is blocked, and only the infrared light from the light projector 102 is transmitted. Therefore, in the imaging element 103 including the color filter 111 in FIG. 6B, it is possible to generate a high-resolution image (image signal) by using the pixel signal of the component of the infrared light obtained from all the pixels.

(C) Third Color Array

In the color filter 111 in FIG. 6C, a first row including the R filter, the W filter, and the B filter and a second row including the W filter, the IR filter, and the G filter are alternately arrayed in a column direction thereof. Also, in the color filter 111 in FIG. 6C, in the first row, the R filter and the B filter are alternately arrayed, and in the second row, the IR filter and the G filter are alternately arrayed.

In the color filter 111 in FIG. 6C, as in the case of the first color array (FIG. 6A), since the respective color filters have the spectral characteristics illustrated in FIG. 7, the infrared light from the light projector 102 is transmitted together with the light of the respective color components. Therefore, in the imaging element 103 including the color filter 111 in FIG. 6C, it is possible to generate the high-resolution image (image signal) by using the pixel signal of the component of the infrared light obtained from all the pixels.

(D) Fourth Color Array

Figure 6D:
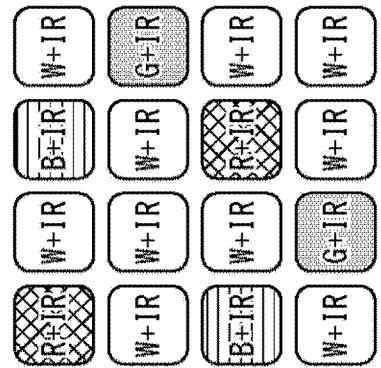

In the color filter 111 in FIG. 6D, a first row including the R filter, the W filter, and the B filter and a second row including the W filter and the G filter are alternately arrayed in a column direction thereof. Also, in the color filter 111 in FIG. 6D, in the first row, the R filter and the B filter are alternately arrayed, and in the second row, the W filter and the G filter are alternately arrayed.

In the color filter 111 in FIG. 6D, as in the case of the first color array (FIG. 6A), since the respective color filters have the spectral characteristics illustrated in FIG. 7, the infrared light from the light projector 102 is transmitted together with the light of the respective color components. Therefore, in the imaging element 103 including the color filter 111 in FIG. 6D, it is possible to generate the high-resolution image (image signal) by using the pixel signal of the component of the infrared light obtained from all the pixels.

(E) Fifth Color Array

In the color filter 111 in FIG. 6E, a first row including the R filter, the G filter, and the B filter and a second row including only the G filters are alternately arrayed, and in the first row, the R filter and the B filter are alternately arrayed.

In the color filter 111 in FIG. 6E, as in the case of the first color array (FIG. 6A), since there are the spectral characteristics of the respective color filter illustrated in FIG. 7, the infrared light from the light projector 102 is transmitted together with the light of the respective color components. Therefore, in the imaging element 103 including the color filter 111 in FIG. 6E, it is possible to generate the high-resolution image (image signal) by using the pixel signal of the component of the infrared light obtained from all the pixels.

As described above, in the imaging element 103, for example, it becomes possible to generate the pixel signal of the component of the infrared light obtained from all the pixels (spectral component of the wavelength band of the invisible light) together with the pixel signals of the respective color components (spectral component of the wavelength band of the visible light) obtained from the pixels corresponding to the respective colors of the color filter 111 filters by arranging the color filter 111 having any color array of the above-described first to fifth color arrays. At that time, the image signal generated including the pixel signal of the infrared light component is the high-resolution image.

Meanwhile, the color arrays described as the above-described first to fifth color arrays are merely an example, and the color filter 111 may adopt another color array. However, in the color filter 111, it is (essentially) required that the spectral characteristics are uniform in the band other than the visible light (infrared light band) of the respective color filters, but other than this, there is no other limitation in algorithm as the array of the respective color filters.

(4) Detailed Configuration of Full-Resolution Image Generation Unit 105

Next, the detailed configuration of the full-resolution image generation unit 105 in FIG. 3 is described later with reference to FIGS. 8, 9A, 9B, 9C, 10A, 10B, 11, and 12. Herein, as an example of the full-resolution image generation unit 105 for generating the full-resolution image, configurations of full-resolution image generation units 105A to 105C are described.

(A) First Configuration

Figure 8:
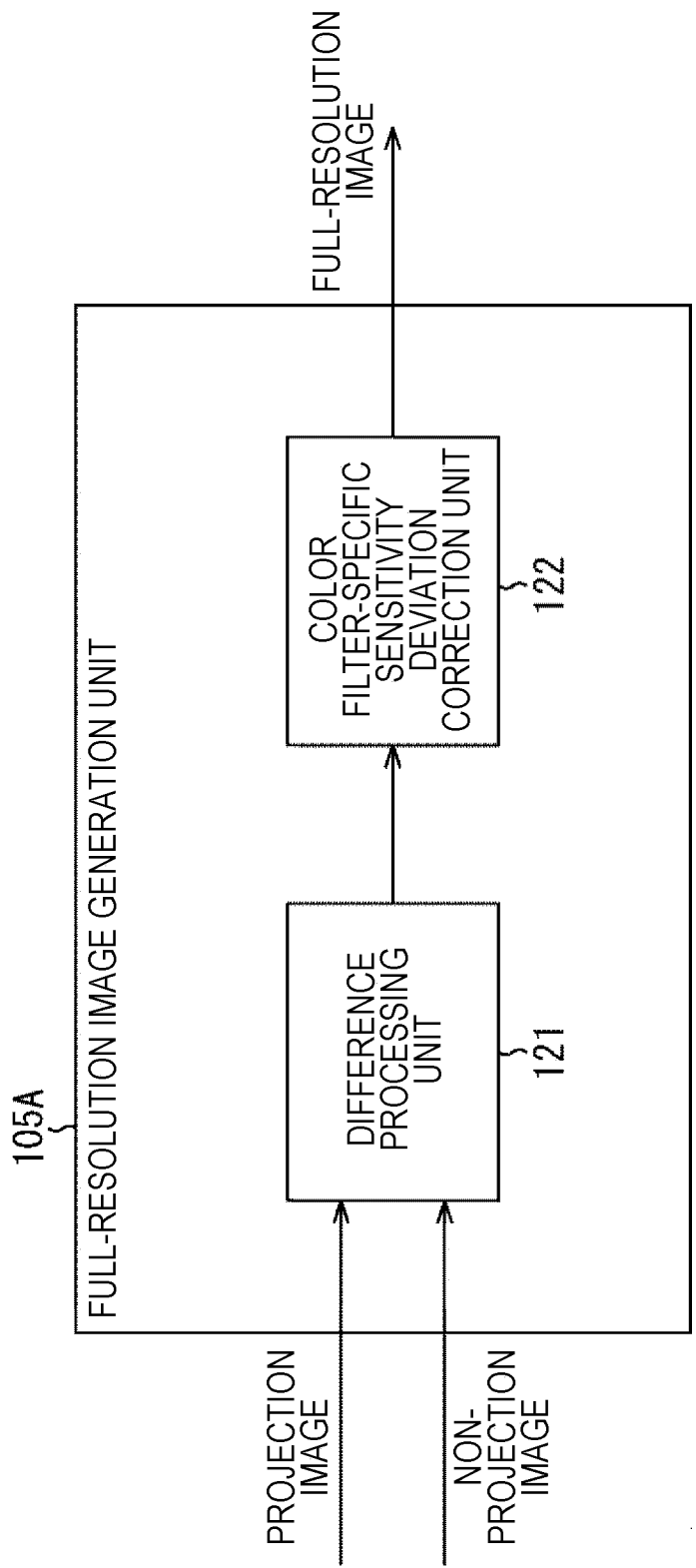
FIG. 8 is a view illustrating a first configuration example of a full-resolution image generation unit.

FIG. 8 is a view illustrating a configuration example of the full-resolution image generation unit 105A.

In FIG. 8, the full-resolution image generation unit 105A includes a difference processing unit 121 and a color filter-specific sensitivity deviation correction unit 122.

In the full-resolution image generation unit 105A, the projection image and the non-projection image which should be processed simultaneously are read out from the delay adjustment buffer 104 (FIG. 3) to be input to the difference processing unit 121. The difference processing unit 121 obtains the difference between (the spectral component of) the projection image and (the spectral component of) the non-projection image, thereby generating a projection image obtained by removing an effect of environment light (hereinafter referred to as a pure projection image) and supplies the same to the color filter-specific sensitivity deviation correction unit 122.

Figure 9A:
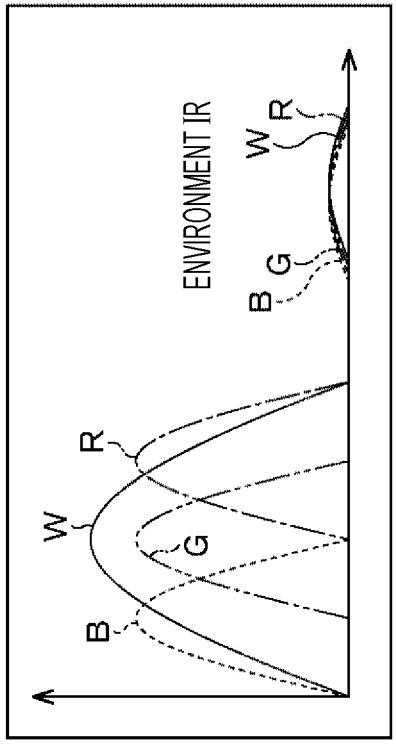
FIGS. 9A, 9B, and 9C are views illustrating an outline of difference processing.

Herein, as illustrated in FIG. 9A, the projection image is generated by using the pixel signals obtained from the light (spectral component of the wavelength band of the visible light) of the respective color components on the visible light side transmitted by the R filter, the G filter, the B filter, and the W filter of the color filter 111 of the imaging element 103 (FIG. 3) and the pixel signal obtained from the infrared light on the invisible light side (spectral component of the wavelength band of the invisible light). Also, the infrared light on the invisible light side includes not only the component of the infrared light projected from the light projector 102 ("projection IR" in the drawing) but also the component of the infrared light included in the environment light ("environment IR" in the drawing).

Figure 9B:
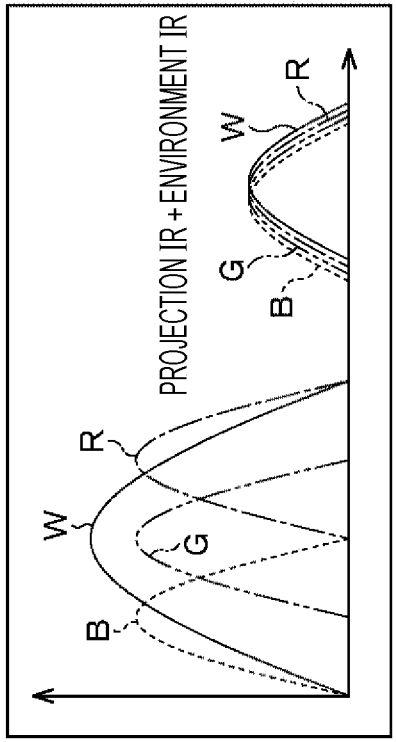

On the other hand, as illustrated in FIG. 9B, the non-projection image is generated by using the pixel signal obtained from the light of the respective color components on the visible light side transmitted by the R filter, the G filter, the B filter, and the W filter of the color filter 111 and the pixel signal obtained from the infrared light on the invisible light side, but since the infrared light from the light projector 102 is not projected, the infrared light on the invisible light side includes only the component of the infrared light included in the environment light ("environmental IR" in the drawing).

Figure 9C:
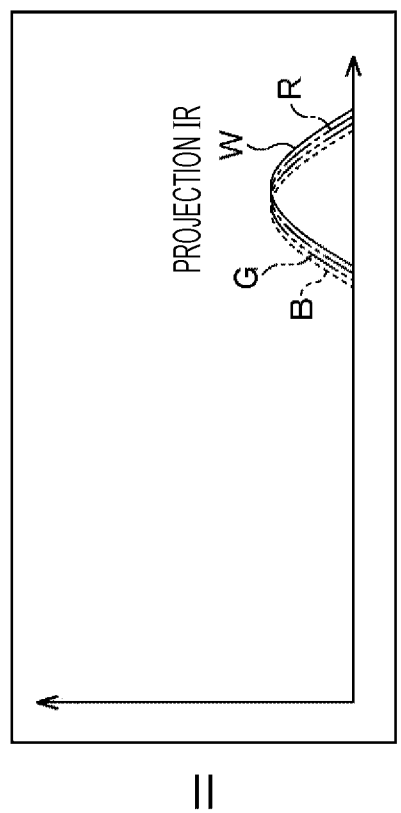

Then, when the difference between (the spectral component of) the projection image in FIG. 9A and (the spectral component of) the non-projection image in FIG. 9B is obtained, as illustrated in FIG. 9C, in (the spectral component of) the pure projection image, while the light of the respective color components on the visible light side is canceled, the infrared light on the invisible light side from which the component of the infrared light included in the environment light is removed only includes the component of the infrared light component projected from the light projector 102 ("projection IR" in the drawing).

By performing the difference processing in this manner, the effect of the environment light may be removed; this is for removing the artifact, because in color filter-specific sensitivity deviation correction processing executed by the color filter-specific sensitivity deviation correction unit 122 on a subsequent stage, the environment light sometimes appears as the artifact.

Returning to the description with reference to FIG. 8, the color filter-specific sensitivity deviation correction unit 122 performs the color filter-specific sensitivity deviation correction processing on the pure projection image supplied from the difference processing unit 121. The color filter-specific sensitivity deviation correction unit 122 outputs an image obtained as a result of the color filter-specific sensitivity deviation correction processing as the full-resolution image to the signal processing unit 106 (FIG. 3).

In the color filter-specific sensitivity deviation correction processing, in order to remove deviation in sensitivity for each of the pixels of the respective color components according to the respective color filters (R, G, B, and W filters) of the color filter 111, gain processing for each color filter is performed. For example, the spectral characteristics of the R filter, the G filter, the B filter, and the W filter might be deviated in (the spectral component of) the pure projection image in FIG. 9C described above, so that the deviation in sensitivity of the color filters (R, G, B, and W filters) is corrected by the color filter-specific gain processing. That is, by executing the color filter-specific gain processing, it is possible to make the spectral characteristics of the respective color filters (R, G, B, and W filters) the same (or those within an allowable range).

For example, as illustrated in FIGS. 10A and 10B, the color filter-specific sensitivity deviation correction unit 122 applies the color filter-specific gain processing which is an example of the color filter-specific sensitivity deviation correction processing on the pure projection image in FIG. 10A, so that the pure projection image in FIG. 10B is obtained. Compared with the pure projection image in FIG. 10A, the pure projection image in FIG. 10B is an image in which a subtle sensitivity ratio for each of the color filters (R, G, B, and W filters) is compensated by the color filter-specific gain processing.

As described above, in the full-resolution image generation unit 105A, the pure projection image is generated by the difference processing between (the spectral component of) the projection image and (the spectral component of) the non-projection image, and further the full-resolution image is generated by the correction of the deviation in sensitivity of the respective color filters (R, G, B, and W filters) of the color filter 111 by the color filter-specific sensitivity deviation correction processing.

Meanwhile, by executing the difference processing by the difference processing unit 121, it is possible to remove the effect of the environment light and eventually remove the artifact; however, for example, if the fact that the light (infrared light) projected by the light projector 102 is sufficiently brighter than the environment light may be secured in a use case, the difference processing is not necessary.

However, an application such as iris authentication using projection of the light with a wavelength other than the visible light usually becomes unable to correctly operate due to the effect of the environment light outdoors and the like in which the environment light is strong, but if this difference processing is executed, even in a case where the environment light is strong, the effect thereof may be removed, and appropriate operation may be performed without being affected by the environment light. Also, for example, in a case of using an application that focuses on an image quality relatively, there is a circumstance that it is inevitable to avoid a risk of the occurrence of the artifact when the environment light is strong, so that it is desirable to execute the difference processing.

Also, it becomes possible to correct the deviation in sensitivity of the respective color filters (R, G, B, and W filters) of the color filter 111 by executing the color filter-specific sensitivity deviation correction processing by the color filter-specific sensitivity deviation correction unit 122; however, for example, assuming an ideal situation in which the sensitivities of the respective color filters of the color filter 111 are not deviated, the correction processing naturally becomes unnecessary. Herein, in order to prevent the sensitivities of the respective color filters (R, G, B, and W filters) of the color filter 111 from deviating, for example, it is assumed that materials of the color filter 111 are limited; but in order not to extremely narrow a range of available applications, it is desirable to execute the correction processing in a case where the material of the color filter 111 is not limited.

(B) Second Configuration

Figure 11:
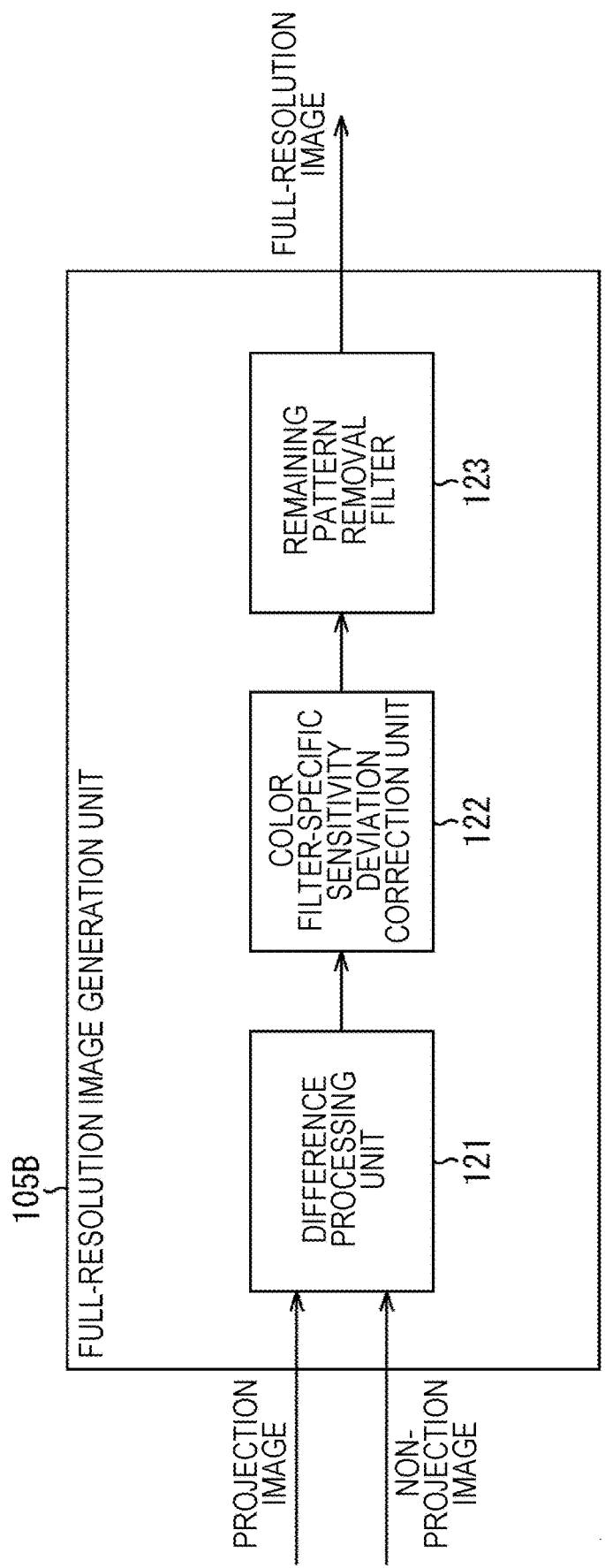
FIG. 11 is a view illustrating a second configuration example of the full-resolution image generation unit.

FIG. 11 is a view illustrating a configuration example of the full-resolution image generation unit 105B.

In FIG. 11, the full-resolution image generation unit 105B includes the difference processing unit 121, the color filter-specific sensitivity deviation correction unit 122, and a remaining pattern removal filter 123. Meanwhile, in the full-resolution image generation unit 105B in FIG. 11, the same reference sign is assigned to the same part as that of the full-resolution image generation unit 105A in FIG. 8, and the description thereof is omitted as appropriate.

That is, the full-resolution image generation unit 105B in FIG. 11 is different from the full-resolution image generation unit 105A in FIG. 8 in that the remaining pattern removal filter 123 is newly provided on a subsequent stage of the color filter-specific sensitivity deviation correction unit 122.

The pure projection image subjected to the color filter-specific sensitivity deviation correction processing is input from the color filter-specific sensitivity deviation correction unit 122 to the remaining pattern removal filter 123. The remaining pattern removal filter 123 further executes remaining pattern removal processing for removing a (slightly) remaining pattern on the pure projection image after the color filter-specific sensitivity deviation correction.

In this remaining pattern removal processing, a filter having a narrow range (of about three taps, for example) corresponding to an edge direction is applied to the pure projection image after the color filter-specific sensitivity deviation correction, for example, so as not to lose high-frequency components, so that the (slightly) remaining pattern is removed.

As described above, in the full-resolution image generation unit 105B, the pure projection image is generated by the difference processing between (the spectral component of) the projection image and (the spectral component of) the non-projection image, the deviation in sensitivity in the respective color filters of the color filter 111 is corrected by the color filter-specific sensitivity deviation correction processing, and further, the pattern slightly remaining in the pure projection image after the color filter-specific sensitivity deviation correction is removed by the remaining pattern removal processing, so that the full-resolution image is generated.

Meanwhile, in a case of using an application that is more sticking to image quality, it is desirable to execute this remaining pattern removal processing in addition to the above-described color filter-specific sensitivity deviation correction processing.

(C) Third Configuration

Figure 12:
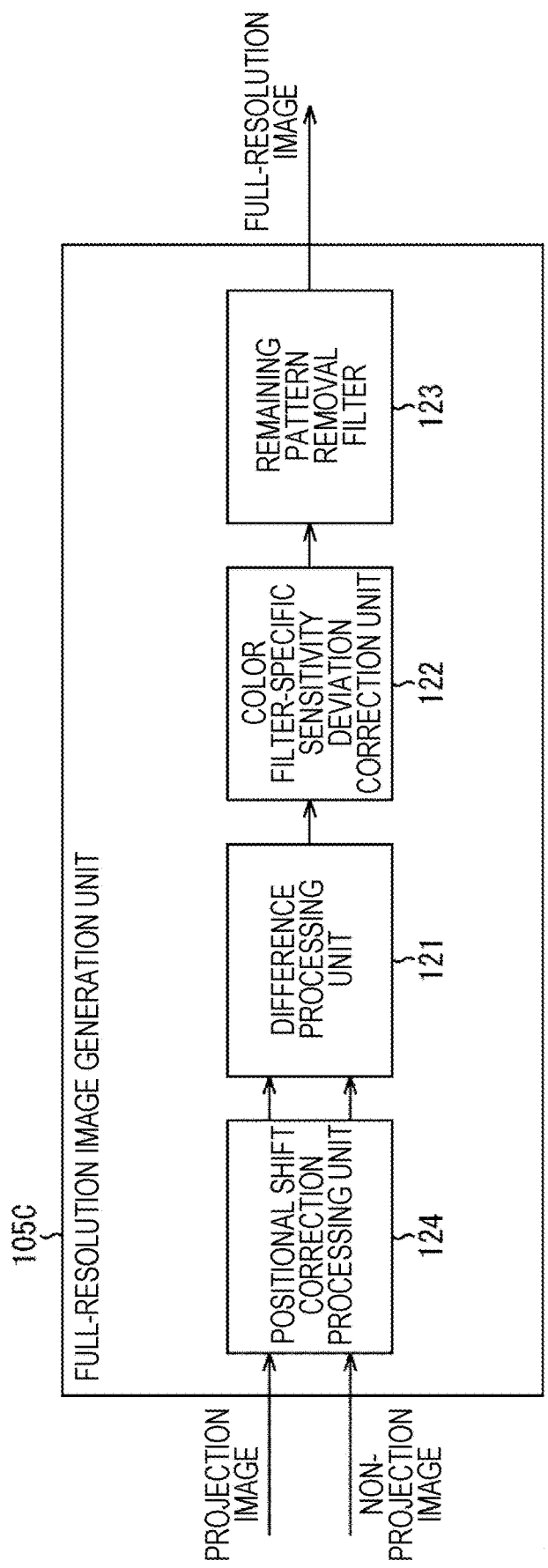
FIG. 12 is a view illustrating a third configuration example of the full-resolution image generation unit.

FIG. 12 is a view illustrating a configuration example of the full-resolution image generation unit 105C.

In FIG. 12, the full-resolution image generation unit 105C includes the difference processing unit 121, the color filter-specific sensitivity deviation correction unit 122, the remaining pattern removal filter 123, and a positional shift correction processing unit 124. Meanwhile, in the full-resolution image generation unit 105C in FIG. 12, the same reference sign is assigned to the same part as that of the full-resolution image generation unit 105B in FIG. 11, and the description thereof is omitted as appropriate.

That is, the full-resolution image generation unit 105C in FIG. 12 is different from the full-resolution image generation unit 105B in FIG. 11 in that the positional shift correction processing unit 124 is newly provided on a preceding stage of the difference processing unit 121.

In the full-resolution image generation unit 105C, the projection image and the non-projection image which should be processed simultaneously are read out from the delay adjustment buffer 104 (FIG. 3) to be input to the positional shift correction processing unit 124. The positional shift correction processing unit 124 corrects the positional shift between the projection image and the non-projection image read out from the delay adjustment buffer 104 and supplies the same to the difference processing unit 121.

In this positional shift correction processing, for example, a method of performing matching in block unit including a predetermined area on the projection image and the non-projection image and deforming the image for each current block to cancel motion, a method of integrating matching results to calculate and remove a shift amount in an entire image and the like is used, so that the positional shift between the projection image and the non-projection image is corrected.

Meanwhile, the block unit used in the block matching may be a relatively limited area as compared with that in the known technology. In addition, this method using the block matching is an example of the positional shift correction processing, and the positional shift correction processing may also be performed using another well-known technology.

As described above, in the full-resolution image generation unit 105C, after the positional shift between the projection image and the non-projection image is corrected by the positional shift correction processing, the pure projection image is generated by the difference processing between (the spectral component of) the projection image and (the spectral component of) the non-projection image, the deviation in sensitivity in the respective color filters of the color filter 111 is corrected by the color filter-specific sensitivity deviation correction processing, and further the pattern slightly remaining in the pure projection image after the color filter-specific sensitivity deviation correction is removed by the remaining pattern removal processing, so that the full-resolution image is generated.

Meanwhile, by executing the positional shift correction processing by the positional shift correction processing unit 124, it becomes possible to remove the positional shift between the projection image and the non-projection image; it is difficult to obtain the projection image and the non-projection image with such a minute time lag that the positional shift is ignorable, so that it is desirable to execute the positional shift correction processing in a case where a cost is acceptable. However, for example, in a case where the projection image and the non-projection image may be obtained with such minute time lag that the positional shift may be ignored, the positional shift correction processing unit 124 is not necessary.

Although the configurations of the full-resolution image generation units 105A to 105C are described as the full-resolution image generation unit 105 in FIG. 3, these configurations are merely an example, and a configuration other than the above-described configuration may be adopted as long as it is possible to generate the full-resolution image (monochrome image) by using the projection image and the non-projection image.

(5) Detailed Configuration of Signal Processing Unit 106

Figure 13:
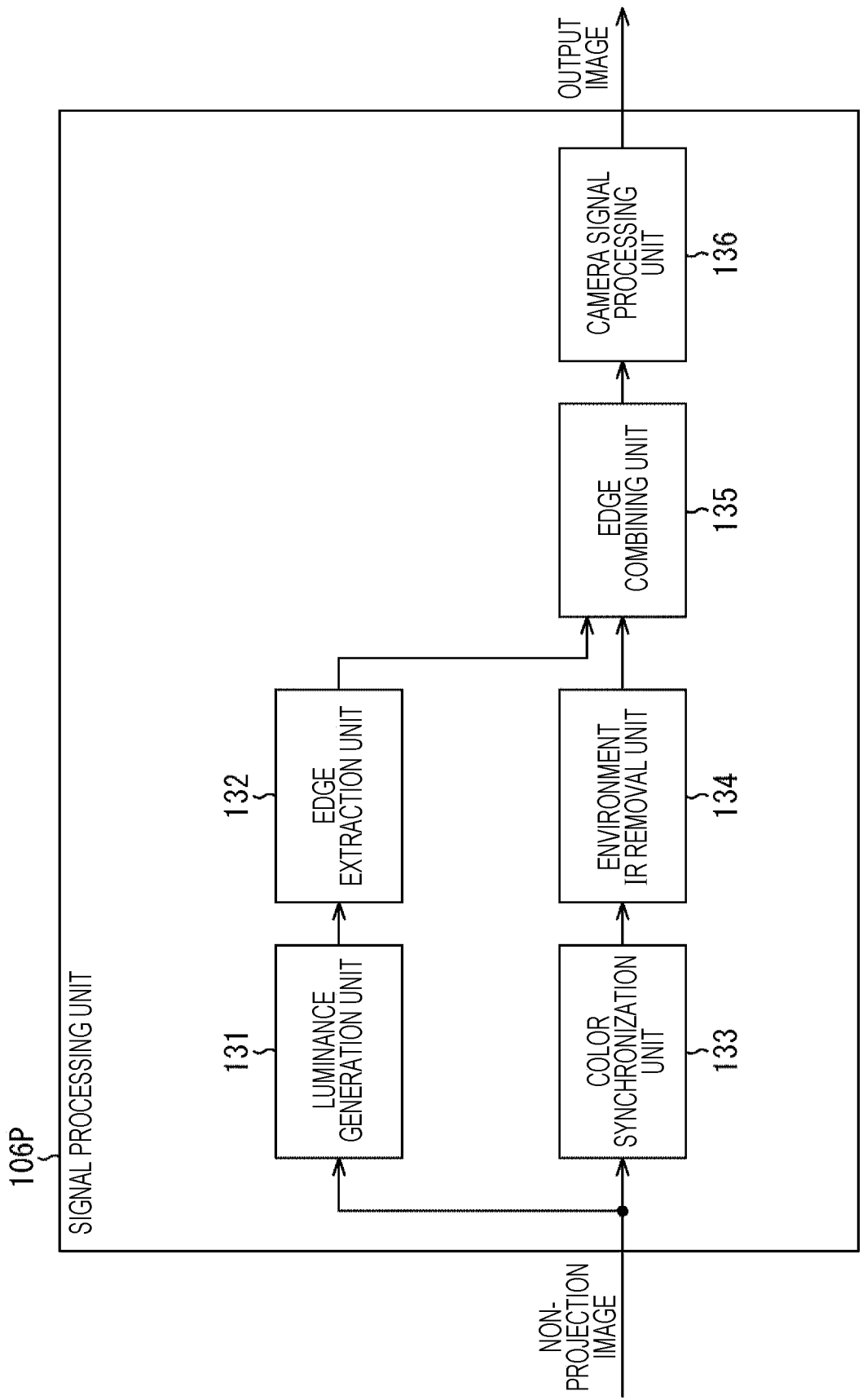
FIG. 13 is a view illustrating a configuration of a conventional signal processing unit.
Figure 14:
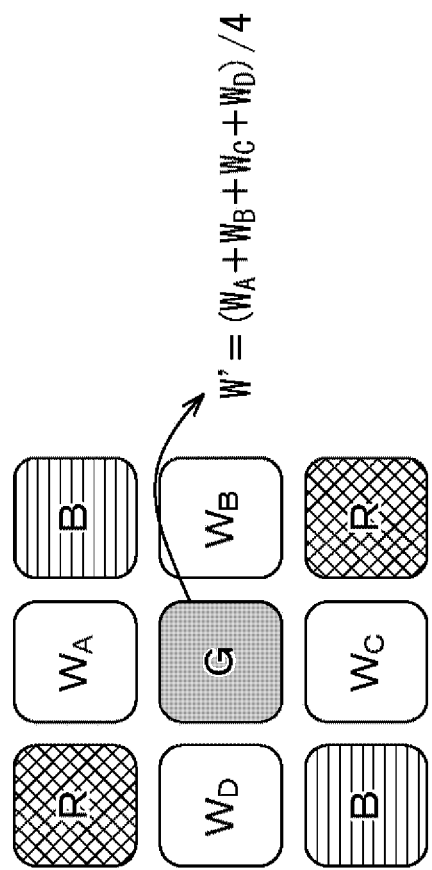
FIG. 14 is a view illustrating a luminance generation method by a luminance generation unit in FIG. 13.
Figure 15:
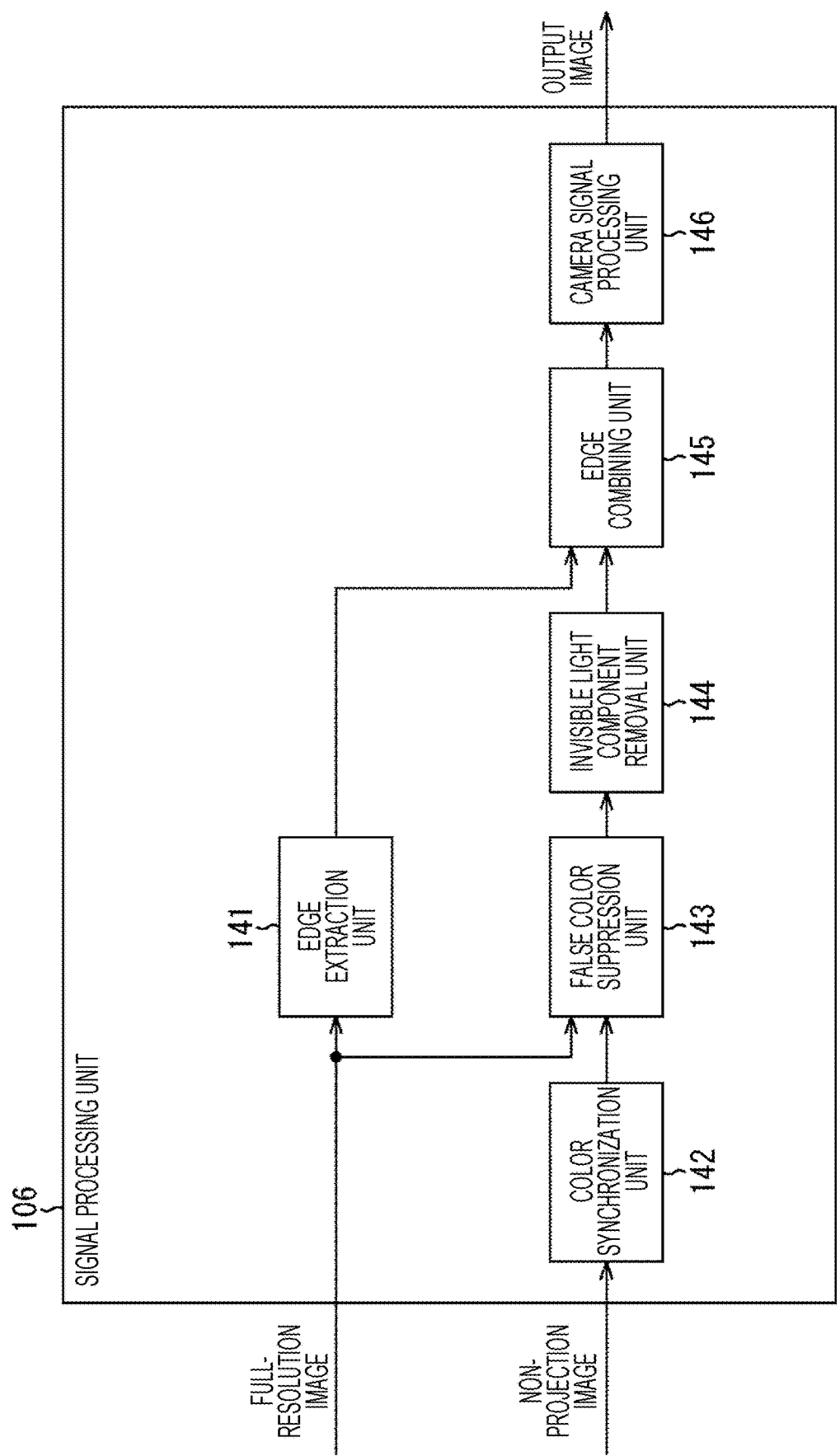
FIG. 15 is a view illustrating a configuration of a signal processing unit of the present technology.

Next, with reference to FIGS. 13 to 15, the detailed configuration of the signal processing unit 106 in FIG. 3 is described. Meanwhile, herein, for the sake of comparison, after describing a conventional signal processing unit 106P with reference to FIGS. 13 and 14, the signal processing unit 106 (FIG. 3) of the present technology is described with reference to FIG. 15.

(Conventional Configuration)

FIG. 13 is a view illustrating a configuration of the conventional signal processing unit 106P.

In FIG. 13, the signal processing unit 106P includes a luminance generation unit 131, an edge extraction unit 132, a color synchronization unit 133, an environment IR removal unit 134, an edge combining unit 135, and a camera signal processing unit 136.

The signal processing unit 106P is divided into an upper path for extracting an edge component of the luminance image (luminance signal) and a lower path for removing the component of the infrared light included in the environment light (environment IR) from the color image (image signal) being a low-frequency component, and the non-projection image is input from a preceding stage to each path.

The upper path includes the luminance generation unit 131 and the edge extraction unit 132. The luminance generation unit 131 generates the luminance image (luminance signal) on the basis of the non-projection image and supplies the same to the edge extraction unit 132.

Herein, as illustrated in FIG. 14, in the imaging element 103, it is assumed that the W filters out of the respective color filters (R, G, B, and W filters) of the color filter 111 are arrayed in a checkered pattern. In this case, the luminance generation unit 131 uses the W pixel signal obtained from the W pixel on coordinates where the W pixel corresponding to the W filter is present, whereas this applies predetermined interpolation processing on coordinates where the W pixel is not present, thereby obtaining the W pixel signal (luminance signal)

For example, in FIG. 14, focusing on the center G pixel out of 3×3 pixels, in the coordinates of the G pixel, the W pixel signal (luminance signal) of the coordinates of the G pixel is obtained by calculating following equation (1), for example, by using the W pixel signal obtained from the W pixels ($W_A$ pixel, $W_B$ pixel, $W_C$ pixel, and $W_D$ pixel) arrayed vertically and laterally.

$$W=(W_A+W_B+W_C+W_D)/4 \quad (1)$$

Meanwhile, equation (1) described above is an example of the interpolation processing, and for example, in order to further improve an image quality, a method of selecting two pixels arranged in the edge direction from the W pixels around the pixel of interest and obtaining an average value thereof or the like may be used.

In addition, herein, although the G pixel at the center of the 3×3 pixels illustrated in FIG. 14 is described as an example; however, for the R pixel, the B pixel, and the other G pixels other than the W pixel similarly, by performing predetermined operation using the W pixel signal of the W pixel around the current pixel, the W pixel signal (luminance signal) on the coordinates corresponding to the current pixel may be obtained. The luminance image (luminance signal) generated in this manner is supplied to the edge extraction unit 132.

Returning to the description with reference to FIG. 13, the edge extraction unit 132 extracts the edge of a high-frequency component by applying high-pass filter processing to the luminance image (luminance signal) supplied from the luminance generation unit 131, and supplies the edge extraction result (edge information) to the edge combining unit 135.

On the other hand, the lower path includes the color synchronization unit 133 and the environmental IR removal unit 134. The color synchronization unit 133 performs low-pass filter processing using only the same color on the pixel signals obtained from the respective color pixels corresponding to the respective color filters of the color filter 111 on the basis of the non-projection image. The respective color images of the low-frequency component obtained by this low-pass filter processing are supplied to the environment IR removal unit 134.

By performing predetermined operation (matrix operation) on the respective color images supplied from the color synchronization unit 133, the environment IR removal unit 134 removes the component of the infrared light included in the environment light (environment IR) from the respective color images. The respective color images from which the infrared light component is removed are supplied to the edge combining unit 135.

The edge information from the edge extraction unit 132 and the respective color images (obtained by removing the infrared light component) from the environmental IR removal unit 134 are input to the edge combining unit 135. The edge combining unit 135 combines the edge information with the color components (low-frequency components) of the respective color images, thereby generating the high-resolution image (image signal) with enhanced resolution, and supplies the same to the camera signal processing unit 136.

The camera signal processing unit 136 performs general camera signal processing on the high-resolution image (image signal) supplied from the edge combining unit 135. As the camera signal processing, for example, white balance processing, demosaic processing, linear matrix operation processing, gamma correction processing, YC conversion processing and the like are performed. Then, the output image obtained by applying this camera signal processing is output to a circuit on a subsequent stage.

In the conventional signal processing unit 106P, the signal processing as described above is performed and the output image is generated from the non-projection image, but when the luminance image (luminance signal) is generated by the luminance generation unit 131, the artifact might be generated. Also, in the conventional signal processing unit 106P, processing for suppressing the false color is not performed, so that the false color might occur. On the other hand, in the signal processing unit 106 of the present technology, countermeasures are taken to suppress the occurrence of the false color and the artifact. Next, the signal processing unit 106 according to the present technology having such a configuration with such measures is described.

(Configuration of Present Technology)

FIG. 15 is a view illustrating a configuration of the signal processing unit 106 (FIG. 3) of the present technology.

In FIG. 15, the signal processing unit 106 includes an edge extraction unit 141, a color synchronization unit 142, a false color suppression unit 143, an invisible light component removal unit 144, an edge combining unit 145, and a camera signal processing unit 146.

The signal processing unit 106 is divided into an upper path for extracting the edge component of the full-resolution image input from the full-resolution image generation unit 105 and a lower path for performing processing of suppressing the false color and removing the component of the invisible light on the respective color image (image signal) obtained from the non-projection image.

The upper path includes the edge extraction unit 141. The edge extraction unit 141 extracts the edge of the high-frequency component by applying the high-pass filter processing to the full-resolution image and supplies the edge extraction result (edge information) to the edge combining unit 145.

Herein, in the above-described conventional signal processing unit 106P (FIG. 13), the artifact might occur when the luminance image (luminance signal) is generated by the luminance generation unit 131; however, in the signal processing unit 106 (FIG. 15) of the present technology, the edge is extracted using the full-resolution image input from the full-resolution image generation unit 105 in place of the luminance image (luminance signal), so that it is possible to suppress the occurrence of the artifact.

On the other hand, the lower path includes the color synchronization unit 142, the false color suppression unit 143, and the invisible light component removal unit 144. On the basis of the non-projection image read out from the delay adjustment buffer 104, the color synchronization unit 142 performs the low-pass filter processing using only the same color on the pixel signals (R+IR, G+IR, B+IR, and W+IR) obtained from the respective color pixels (R, G, B, and W pixels) corresponding to the respective color filters (R, G, B, and W filters) of the color filter 111. The respective color images of the low-frequency component obtained by this low-pass filter processing are supplied to the false color suppression unit 143.

The respective color images from the color synchronization unit 142 and the full-resolution image from the full-resolution image generation unit 105 (FIG. 3) are input to the false color suppression unit 143. The false color suppression unit 143 performs false color suppression processing of suppressing the occurrence of the false color by processing the respective color images using the full-resolution image.

Herein, the false color occurs when pixels are thinned out so that the high-frequency component "is folded back" to the low-frequency side. Therefore, in the respective color images, "folding back" might occur. On the other hand, since the full-resolution image has all the pixels, the "folding back" does not occur.

In the false color suppression processing, on the assumption that patterns of the full-resolution image and the respective color images are similar, the full-resolution image is thinned out as the respective color images and the "folding back" the same as the "folding back" occurring in the respective color images is generated and an amount of the folding back is calculated (estimated). Then, in the false color suppression processing, it is possible to suppress the occurrence of the false color by canceling the "folding back" occurring in the respective color images on the basis of a calculated (estimated) amount of the folding back.

The respective color images processed by the false color suppression unit 143 are supplied to the invisible light component removal unit 144. The invisible light component removal unit 144 performs invisible light component removal processing of removing the invisible light component in the respective color images. In this invisible light component removal processing, for example, in a case where the non-projection image is input to the signal processing unit 106, there is the infrared light included in the environment light as the invisible light, so that predetermined operation (matrix operation) is performed on the respective color images, and the component of the infrared light of the environment light (environment IR) is removed. The respective color images from which the invisible light component is removed by the invisible light component removal processing are supplied to the edge combining unit 145.

Meanwhile, a reason for removing the invisible light component in the respective color images by performing the invisible light component removal processing by the invisible light component removal unit 144 is as follows. That is, as described above, since it is necessary to generate the image signal corresponding to the light of the wavelength band of the invisible light (for example, the infrared light) in the imaging element 103 (FIG. 3), it is not possible to provide a filter (for example, an IR cut filter) for cutting the light of the wavelength band of the invisible light provided in the general camera, so that the invisible light component is herein removed by the signal processing.

In addition, although it is described later in detail with reference to FIG. 25, there is a case where the projection image is input to the signal processing unit 106 in place of the non-projection image, and the invisible light in this case may include the infrared light projected from the light projector 102 in addition to the infrared light included in the environment light, so that in this case, the infrared light component of the environment light (environment IR) and the projected infrared component (projected light IR) are removed.

The edge information from the edge extraction unit 141 and the respective color images (from which the invisible light component is removed) from the invisible light component removal unit 144 are input to the edge combining unit 145. The edge combining unit 145 combines the edge information with the color components (low-frequency components) of the respective color images, thereby generating the high-resolution image with enhanced resolution (image signal), and supplies the same to the camera signal processing unit 136. Meanwhile, an output of the edge combining unit 145 may be, for example, a RGB image signal, an image signal of Bayer array and the like.

The camera signal processing unit 146 performs general camera signal processing on the high-resolution image (image signal) supplied from the edge combining unit 145. As the camera signal processing, for example, white balance processing, demosaic processing, linear matrix operation processing, gamma correction processing, YC conversion processing and the like are performed. Then, the output image obtained by applying this camera signal processing is output to a circuit on a subsequent stage. Meanwhile, a configuration of the signal processing unit 106 may be that without the camera signal processing unit 146.

As described above, in the signal processing unit 106 of the present technology, the edge is extracted using not the luminance image (luminance signal) generated by the luminance generation unit 131 (FIG. 13) but the full-resolution image input from the full-resolution image generation unit 105, so that the occurrence of the artifact may be suppressed. Also, in the signal processing unit 106 of the present technology, the false color suppression unit 143 processes the respective color images by using the full-resolution image input from the full-resolution image generation unit 105, thereby performing the false color suppression processing, so that the occurrence of the false color may be suppressed.

Meanwhile, in the luminance generation processing by the conventional luminance generation unit 131 (FIG. 13), the occurrence of the artifact may be suppressed by using the full-resolution image (pure projection image) generated by the full-resolution image generation unit 105 as a guide.

For example, in the conventional luminance generation unit 131 (FIG. 13), the W pixel is interpolated by selecting the pixels arranged in the edge direction from the W pixels around the pixel of interest and applying the filter, but if there is a high-frequency component pattern, there is a case where the edge direction cannot be determined and the artifact occurs as a result. In this case, the correct edge direction may be obtained by using the full-resolution image for detecting the edge direction when interpolating the W pixel. By interpolating the W pixel by obtaining the edge direction using the full-resolution image as a so-called guide in this manner, it is possible to suppress the occurrence of the artifact and to improve the image quality.

<3. Processing Flow>

(Flow of Image Processing)

Next, a flow of image processing executed by the imaging device 10 in FIG. 3 is described with reference to a flowchart in FIG. 16.

At step S101, the light projector 102 determines whether it is the projection timing of the infrared light according to the control by the control unit 101.

At step S101, in a case where it is determined to be the projection timing of the infrared light, the procedure shifts to step S102. At step S102, the light projector 102 projects the infrared light according to the synchronization signal from the control unit 101. That is, in this case, the projection of the infrared light by the light projector 102 is turned on.

On the other hand, at step S101, in a case where it is determined not to be the projection timing of the infrared light, the procedure shifts to step S103. At step S103, the light projector 102 stops projecting the infrared light according to the synchronization signal from the control unit 101. That is, in this case, the projection of the infrared light by the light projector 102 is turned off.

That is, according to a determination result at step S101, the light projector 102 is turned on/off (S102 and S103), so that the light of the wavelength band of the projection wavelength is projected so as to blink from the light projector 102. When the processes at step S102 or step S103 are finished, the procedure shifts to step S104.

At step S104, the imaging element 103 images the subject according to the synchronization signal from the control unit 101. At step S105, it is determined whether the image imaged by the process at step S104 is a first frame.

In a case where it is determined at step S105 that the imaged image is the first frame, that is, in a case where it is determined that the projection image and the non-projection image which should be processed simultaneously are not held in the delay adjustment buffer 104, the procedure shifts to step S106. At step S106, the imaging element 103 overwrites the image imaged by the process at step S104 in the delay adjustment buffer 104. As a result, any one of the projection image and the non-projection image is held in the delay adjustment buffer 104.

When the process at step S105 is finished, the procedure shifts to step S110. In a case where it is determined to continue the procedure at step S110, the procedure returns to step S101 and the above-described processes are repeated.

Then, in a case where it is determined at step S105 that the imaged image is not the first frame, the procedure shifts to step S107. In this case, in the delay adjustment buffer 104, the image imaged by the process at step S104 is written, so that the projection image and the non-projection image which should be processed simultaneously are held.

At step S107, the full-resolution image generation unit 105 reads out the projection image and non-projection image which should be processed simultaneously from the delay adjustment buffer 104.

At step S108, the full-resolution image generation unit 105 performs full-resolution image generation processing using the projection image and the non-projection image read out in the process at step S107. In this full-resolution image generation processing, for example, the difference processing or the like of obtaining the difference between (the spectral component of) the projection image and (the spectral component of) the non-projection image is performed, so that the full-resolution image is generated. Meanwhile, detailed contents of the full-resolution image generation processing are described later with reference to a flowchart in FIG. 17.

At step S109, the signal processing unit 106 performs the signal processing of processing the non-projection image (or the projection image) using the full-resolution image generated by the process at step S108. In this signal processing, for example, processing such as edge extraction processing and the false color suppression processing using the full-resolution image is performed, and the output image is generated from the full-resolution image and the non-projection image (or the projection image). Meanwhile, detailed contends of the signal processing are described later with reference to a flowchart in FIG. 20.

When the process at step S109 is finished, the procedure shifts to step S110. In a case where it is determined to continue the procedure at step S110, the procedure returns to step S101 and the above-described processes are repeated. Then, in a case where it is determined at step S110 that the procedure is finished, the image processing in FIG. 16 is finished.

The flow of the image processing is described above. In this image processing, the full-resolution image is generated from the projection image and the non-projection image by the full-resolution image generation processing (S108), the processing such as the edge extraction processing and the false color suppression processing using the full-resolution image is performed by the signal processing (S109), and the output image is generated from the full-resolution image and the non-projection image (or the projection image).

That is, by performing the edge extraction processing using the full-resolution image, the occurrence of the artifact may be suppressed. Also, the occurrence of the false color may be suppressed by performing the false color suppression processing using the full-resolution image. In this manner, in the image processing in FIG. 16, the high-precision image processing for suppressing the occurrence of the false color and the artifact is performed, so that the user who looks at the image (output image) does not feel uncomfortable. Also, for example, if the full-resolution image is used in recently developed sensing purposes, it is possible to suppress deterioration in sensing performance.

(Flow of Full-Resolution Image Generation Processing)

Figure 16:
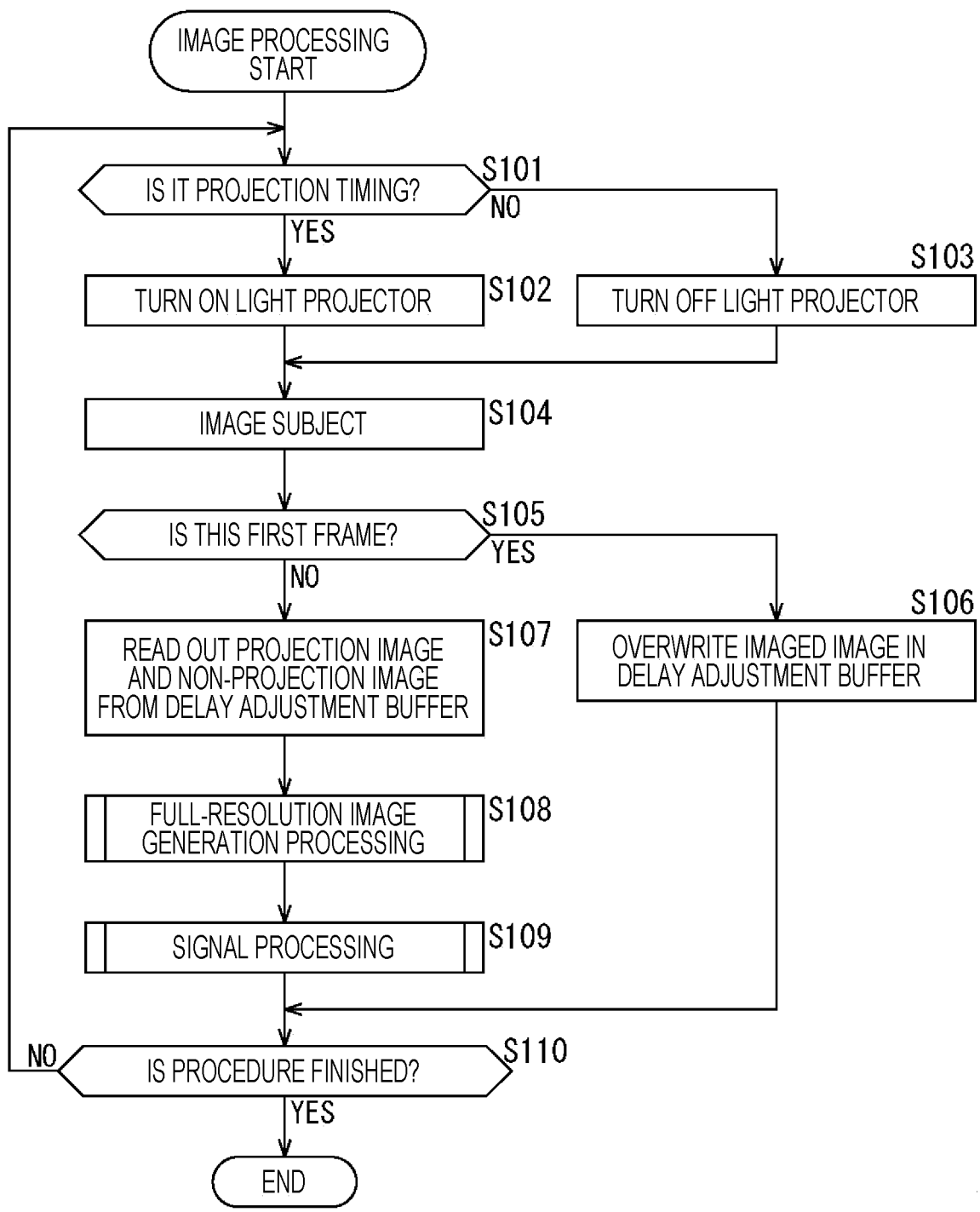
FIG. 16 is a flowchart illustrating a flow of image processing of the present technology.
Figure 17:
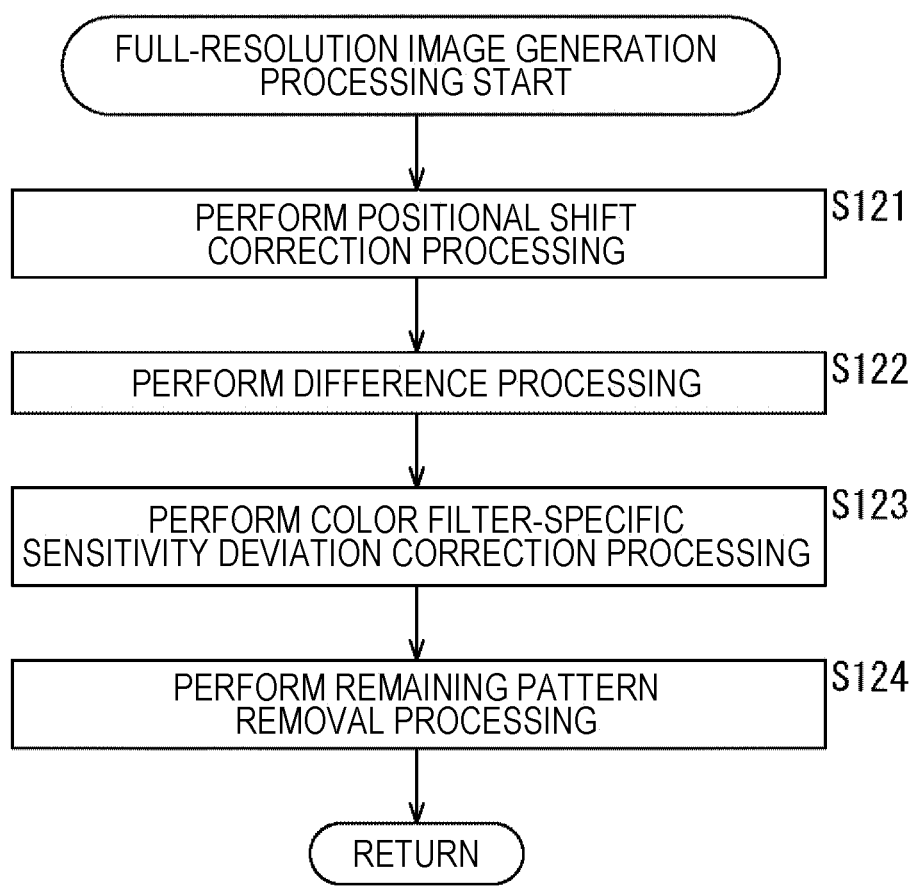
FIG. 17 is a flowchart for illustrating a flow of the full-resolution image generation processing in FIG. 16.

Herein, with reference to the flowchart in FIG. 17, the detailed processing contents of the full-resolution image generation processing corresponding to the process at step S108 in FIG. 16 are described.

At step S121, the positional shift correction processing unit 124 performs the positional shift correction processing of correcting the positional shift between the projection image and the non-projection image read out from the delay adjustment buffer 104 in the process at step S107 (FIG. 16).

In this positional shift correction processing, for example, a method of performing matching in block unit on the projection image and the non-projection image and deforming the image for each current block to cancel the motion, a method of integrating matching results to calculate and remove a shift amount in an entire image and the like is used, so that the positional shift between the projection image and the non-projection image is corrected.

At step S122, the difference processing unit 121 performs the difference processing of obtaining the difference between (the spectral component of) the projection image and (the spectral component of) the non-projection image the positional shift between which is corrected by the process at step S121.

In this difference processing, for example, as illustrated in FIGS. 9A, 9B, and 9C described above, by obtaining the difference between (the spectral component of) the projection image and (the spectral component of) the non-projection image, the pure projection image from which the effect of the environment light is removed is generated.

At step S123, the color filter-specific sensitivity deviation correction unit 122 performs the color filter-specific sensitivity deviation correction processing of removing the deviation in sensitivity for the pixels of the respective color components corresponding to the respective color filters (R, G, B, and W filters) of the color filter 111 on the pure projection image generated by the process at step S122.

In this color filter-specific sensitivity deviation correction processing, for example, the color filter-specific gain processing of making the spectral characteristics of the respective color filters (R, G, B, and W filters) the same (or those within an allowable range). As a result, the pure projection image becomes the image in which a subtle sensitivity ratio for each of the color filters (R, G, B, and W filters) is compensated.

At step S124, the remaining pattern removal filter 123 performs the remaining pattern removal processing of removing a (slightly) remaining pattern on the pure projection image corrected by the process at step S123.

In this remaining pattern removal processing, the filter having a narrow range (of about three taps, for example) corresponding to the edge direction is applied so as not to lose the high-frequency components, for example, so that the (slightly) remaining pattern is removed. Meanwhile, when the process at step S124 is finished, the procedure returns to step S108 in FIG. 16, and the subsequent processes are executed.

The flow of the full-resolution image generation processing is described above. In this full-resolution image generation processing, the positional shift correction processing, the difference processing, the color filter-specific sensitivity deviation correction processing, and the remaining pattern removal processing are executed, so that the full-resolution image is generated from the projection image and the non-projection image.

FIGS. 18A, 18B, 19A, and 19B illustrate an example of the pure projection image generated as the full-resolution image by executing the full-resolution image generation processing in FIG. 17. Meanwhile, FIGS. 18A, 18B, 19A, and 19B illustrate the luminance image (luminance signal) generated by the luminance generation unit 131 of the conventional signal processing unit 106P (FIG. 13) for comparison.

FIG. 18A illustrates the luminance image (luminance signal) generated by the luminance generation unit 131 (FIG. 13), and in a half circle on a side with higher density in multiple circles in the drawing, a pattern different from the actual pattern appears and the artifact occurs. On the other hand, FIG. 18B illustrates the pure projection image (full-resolution image) generated by the full-resolution image generation unit 105 (FIG. 3), and a correct pattern appears also in a half circle on a side with higher density in multiple circles in the drawing.

Also, FIG. 19A illustrates the luminance image (luminance signal) generated by the luminance generation unit 131 (FIG. 13), and in a part of multiple lines including a plurality of types of lines illustrated in a band shape in the drawing, a pattern different from the actual pattern appears and the artifact occurs. On the other hand, FIG. 19B illustrates a pure projection image (full-resolution image) generated by the full-resolution image generation unit 105 (FIG. 3), and a number of lines illustrated in a band shape in the drawing appear correctly.

As described above, in the conventional signal processing unit 106P (FIG. 13), the artifact occurs in the luminance image (luminance signal) generated by the luminance generation unit 131 (FIG. 13); however, in the signal processing unit 106 of the present technology, the edge information is extracted using the pure projection image (full-resolution image) generated by the full-resolution image generation unit 105 (FIG. 3), so that it is possible to suppress the occurrence of the artifact.

Meanwhile, as described above, the positional shift correction processing, the difference processing, the color filter-specific sensitivity deviation correction processing, and the remaining pattern removal processing are examples of the full-resolution image generation processing, and it is not required that all of them be executed; other processing may also be performed.

<Flow of Signal Processing>

Figure 20:
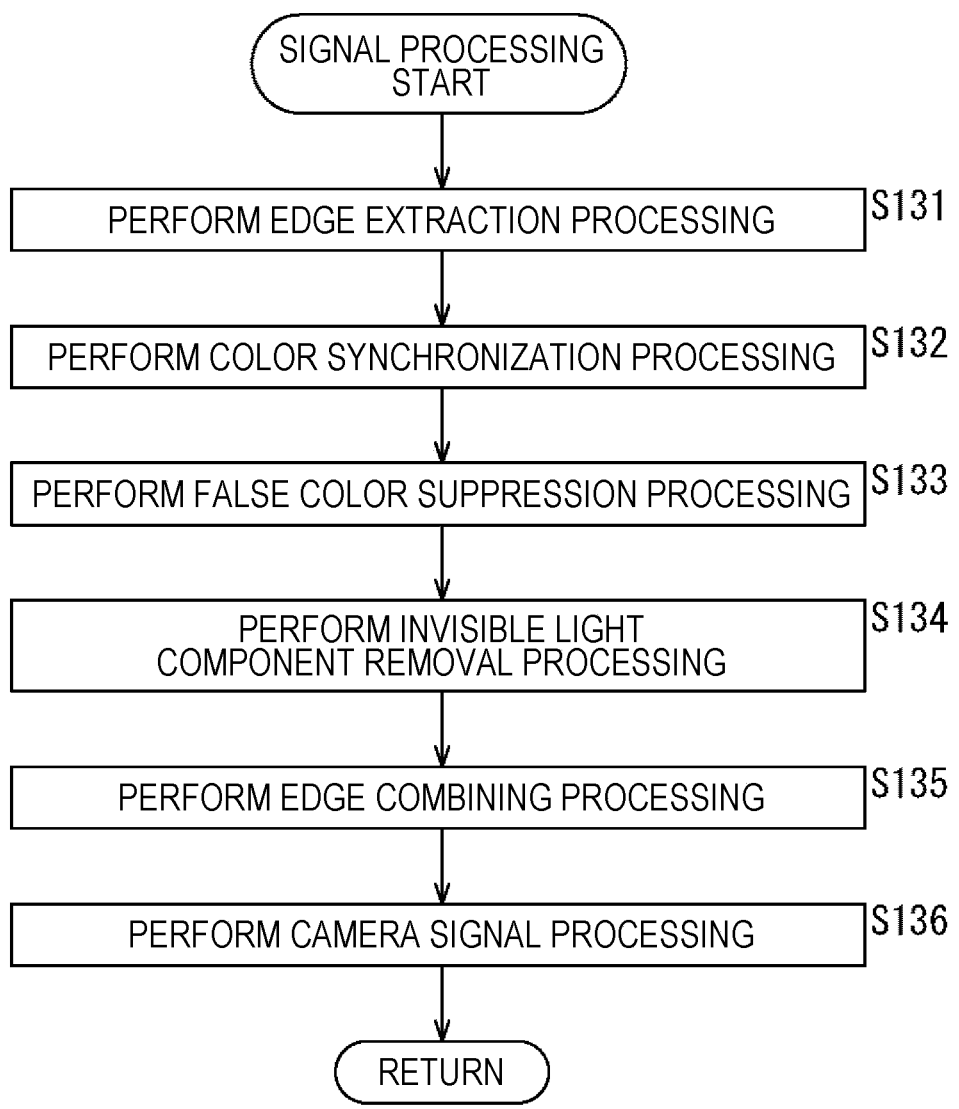
FIG. 20 is a flowchart illustrating a flow of signal processing in FIG. 16.

Next, with reference to the flowchart in FIG. 20, the detailed processing contents of the signal processing corresponding to the process at step S109 in FIG. 16 are described.

At step S131, the edge extraction unit 141 performs the edge extraction processing of extracting the edge information from the full-resolution image generated by the process at step S108 (FIG. 16). In this edge extraction processing, the high-pass filter processing is performed on the full-resolution image, and the edge of the high-frequency component is extracted, so that the edge information is obtained.

At step S132, the color synchronization unit 142 performs the color synchronization processing using the non-projection image read out by the process at step S107 (FIG. 16). In the color synchronization processing, the low-pass filter processing using only the same color is performed on the pixel signals (R+IR, G+IR, B+IR, and W+IR) obtained from the respective color pixels (R, G, B, and W pixels) corresponding to the respective color filters (R, G, B, and W filters) of the color filter 111, so that the respective color images of the low-frequency component are obtained.

At step S133, the false color suppression unit 143 processes the respective color images obtained by the process at step S132 using the full-resolution image generated by the process at step S108 (FIG. 16), thereby performing the false color suppression processing of suppressing the occurrence of the false color. For example, in this false color suppression processing, the occurrence of the false color is suppressed by estimating the amount of the folding back occurring in the respective color images by using the full-resolution image and canceling the folding back occurring in the respective color images in accordance with the estimated amount of the folding back.

At step S134, the invisible light component removal unit 144 performs the invisible light component removal processing of removing the component of the invisible light in the respective color images in which the occurrence of the false color is suppressed by the process at step S133. In this invisible light component removal processing, by performing predetermined operation (matrix operation) on the respective color images in which the occurrence of the false color is suppressed, the component of infrared light included in the environment light (environment IR) is removed.

At step S135, the edge combining unit 145 performs edge combining processing of combining the edge information extracted by the process at step S131 with the color components (low frequency components) of the respective color images from which the invisible light component is removed by the process at step S134, thereby generating the high-resolution image with enhanced resolution (image signal).

At step S136, the camera signal processing unit 146 generates the output image by performing the camera signal processing on the high-resolution image (image signal) obtained by the process at step S135. As the camera signal processing, for example, general camera signal processing such as the white balance processing, demosaic processing, linear matrix operation processing, gamma correction processing, YC conversion processing and the like is performed. Meanwhile, when the process at step S136 is finished, the procedure returns to step S109 in FIG. 16, and the subsequent processes are executed.

The flow of the signal processing is described above. In this signal processing, processing such as the edge extraction processing using the full-resolution image (S131) and the false color suppression processing using the full-resolution image (S133) are performed, and the output image is generated from the full-resolution image and the non-projection image (or the projection image). Herein, by performing the edge extraction processing using the full-resolution image (S131), the occurrence of the artifact may be suppressed. Also, the occurrence of the false color may be suppressed by performing the false color suppression processing using the full-resolution image (S133).

<4. Variation>

Meanwhile, the above-described imaging device 10 is not limited to the configuration illustrated in FIG. 3, and other configurations may also be adopted. Then, a variation of the imaging device 10 in FIG. 3 is next described with reference to FIGS. 21 to 25.

(A) First Other Configuration

Figure 21:
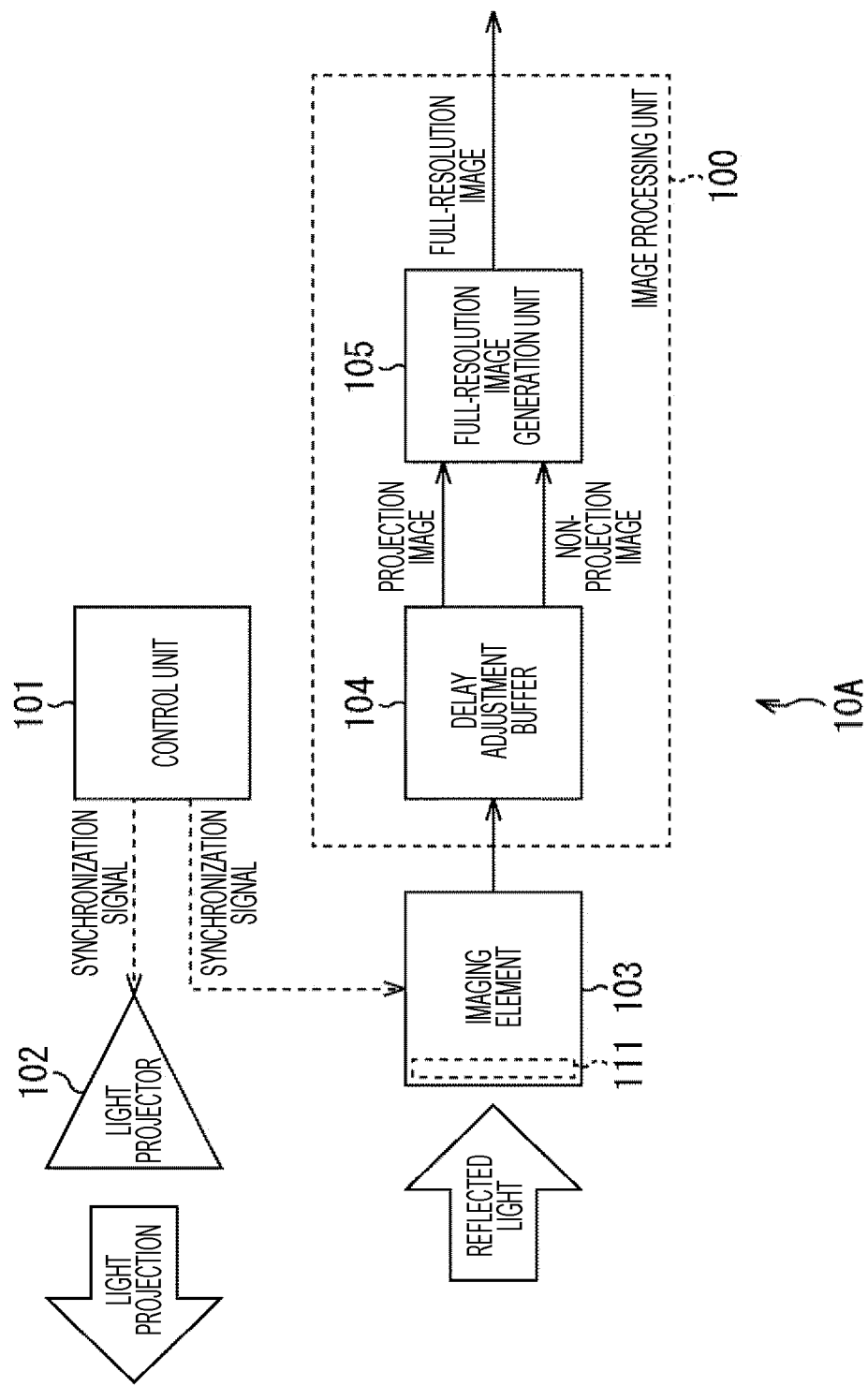
FIG. 21 is a view illustrating a first other configuration example of the imaging device.

FIG. 21 is a view illustrating a configuration example of an imaging device 10A. Meanwhile, in the imaging device 10A in FIG. 21, the same part as that of the imaging device 10 in FIG. 3 is assigned with the same reference sign, and the description thereof is appropriately omitted.

In FIG. 21, the imaging device 10A includes a control unit 101, a light projector 102, an imaging element 103, a delay adjustment buffer 104, and a full-resolution image generation unit 105. That is, the imaging device 10A in FIG. 21 is different from the imaging device 10 in FIG. 3 in that a signal processing unit 106 provided on a subsequent stage of the full-resolution image generation unit 105 is removed.

Herein, when generating a monochrome image (luminance image) for sensing purposes, for example, instead of generating a color image to use for viewing purposes, it suffices to output a full-resolution image (monochrome image) as is without performing signal processing by the signal processing unit 106, so that in the imaging device 10A, the full-resolution image generated by the full-resolution image generation unit 105 is output.

As described above, in the imaging device 10A, by allowing the full-resolution image in which occurrence of artifact is suppressed to output as the monochrome image (luminance image) used for sensing purposes, it is possible to suppress deterioration in sensing performance. Meanwhile, in a case of generating the full-resolution image for sensing purposes, a filter (IR band pass filter) for a projection wavelength is not necessary in the light projector 102.

(B) Second Other Configuration

Figure 22:
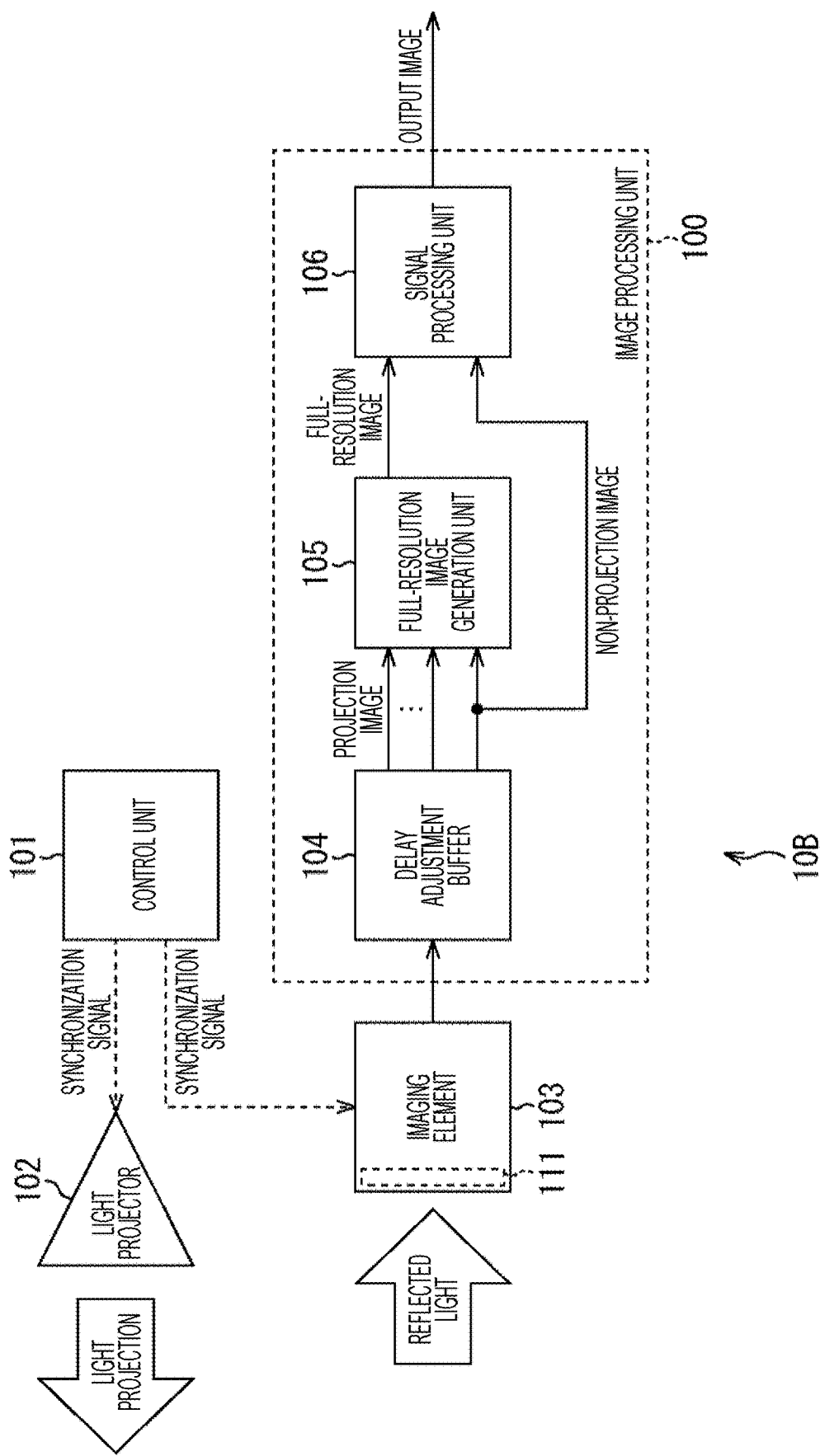
FIG. 22 is a view illustrating a second other configuration example of the imaging device.

FIG. 22 is a view illustrating a configuration example of an imaging device 10B. Meanwhile, in the imaging device 10B in FIG. 22, the same part as that of the imaging device 10 in FIG. 3 is assigned with the same reference sign, and the description thereof is appropriately omitted.

In FIG. 22, the imaging device 10B includes a control unit 101, a light projector 102, an imaging element 103, a delay adjustment buffer 104, a full-resolution image generation unit 105, and a signal processing unit 106.

That is, the imaging device 10B in FIG. 22 is different from the imaging device 10 in FIG. 3 in that, when the full-resolution image generation unit 105 reads out a projection image and a non-projection image which should be processed simultaneously from the delay adjustment buffer 104, not one projection image but two or more projection images are read out. The full-resolution image generation unit 105 may improve precision of the projection image by using a plurality of projection images, thereby improving precision of a generated full-resolution image as a result.

The full-resolution image generation unit 105 processes a plurality of projection images and one non-projection image read out from the delay adjustment buffer 104 to generate the full-resolution image. Herein, for example, an average projection image is obtained from a plurality of projection images and difference processing or the like between (a spectral component of) the average projection image and (a spectral component of) the non-projection image is performed, so that the full-resolution image is generated.

As described above, in the imaging device 10B, it is possible to generate the full-resolution image with higher precision by using a plurality of projection images, so that it is possible to remove a false color and an artifact with higher precision. Meanwhile, in the imaging device 10B, an example of a case of using a plurality of projection images is illustrated, but the full-resolution image may also be generated by using a plurality of non-projection images. That is, the number of projection images and non-projection images used when the full-resolution image is generated is arbitrary.

(C) Third Other Configuration

Figure 23:
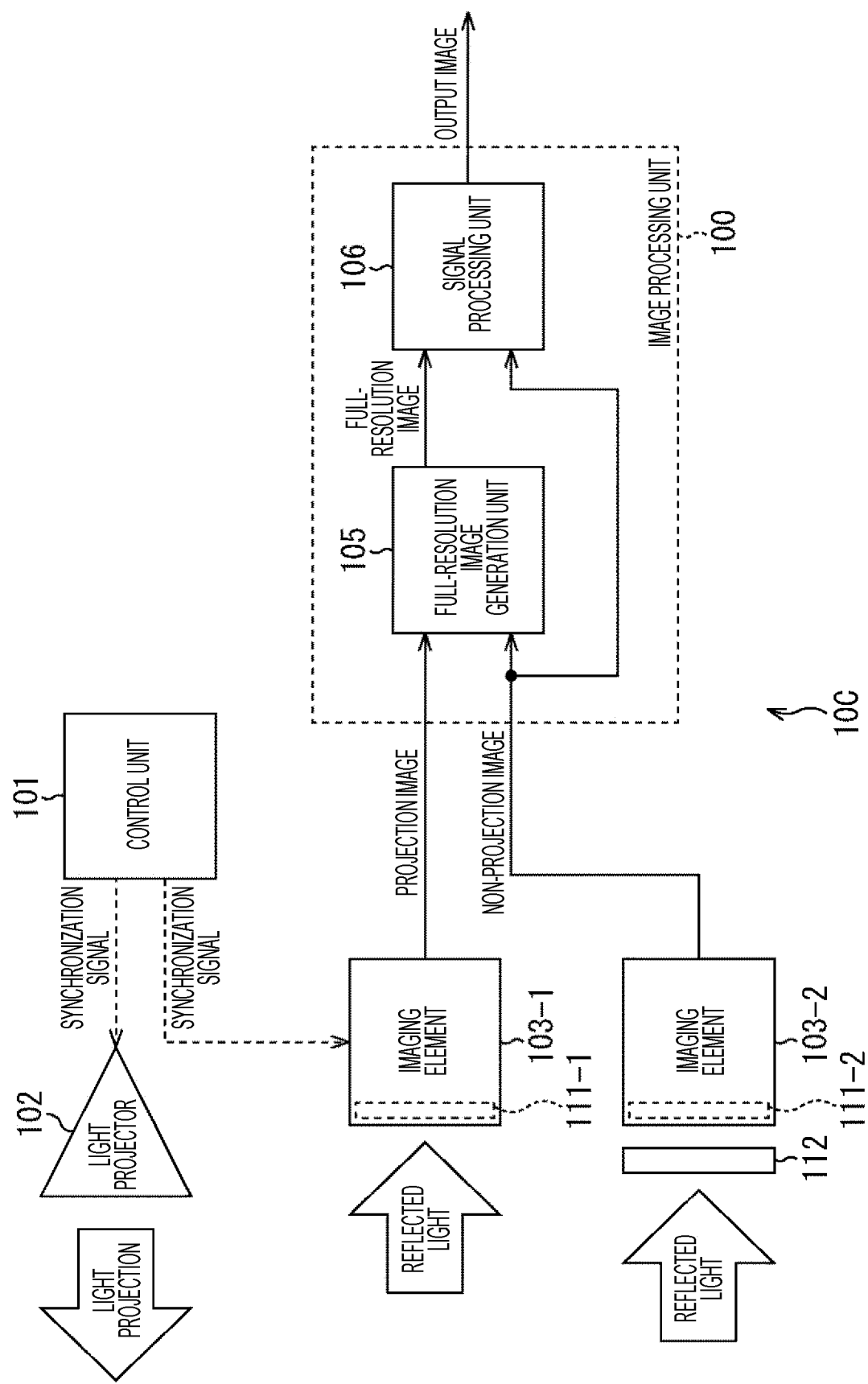
FIG. 23 is a view illustrating a third other configuration example of the imaging device.

FIG. 23 is a view illustrating a configuration example of an imaging device 10C. Meanwhile, in the imaging device 10C in FIG. 23, the same part as that of the imaging device 10 in FIG. 3 is assigned with the same reference sign, and the description thereof is appropriately omitted.

In FIG. 23, the imaging device 10C is different from the imaging device 10 in FIG. 3 in that imaging elements 103-1 and 103-2 are provided in place of the imaging element 103, and an IR cut filter 112 is further provided on an incident side of light (reflected light) of the imaging element 103-2. Also, in the imaging device 10C, the delay adjustment buffer 104 provided on a preceding stage of the full-resolution image generation unit 105 is removed.

The imaging element 103-1 generates a projection image obtained from light (reflected light) including infrared light projected from a light projector 102 and outputs the same to a full-resolution image generation unit 105. On the other hand, the imaging element 103-2 generates a non-projection image obtained from the light (reflected light) from which the infrared light is cut by the IR cut filter 112 and outputs the same to the full-resolution image generation unit 105.

The projection image from the imaging element 103-1 and the non-projection image from the imaging element 103-2 are input to the full-resolution image generation unit 105. The full-resolution image generation unit 105 processes the projection image and the non-projection image input from different imaging elements 103 (103-1 and 103-2) to generate a full-resolution image.

As described above, in the imaging device 10C, the projection image generated by the imaging element 103-1 and the non-projection image generated by the imaging element 103-2 are input to the full-resolution image generation unit 105 at the same timing, so that the delay adjustment buffer 104 (FIG. 3) becomes unnecessary. Also, in the imaging device 10 in FIG. 3, since the projection image and the non-projection image are alternately generated, it is necessary to reduce a time lag between the projection image and the non-projection image processed at the same time, but since the projection image and the non-projection image are generated by the imaging elements 103 (103-1 and 103-2) different from each other in the imaging device 10C, the projection image and the non-projection image input to the full-resolution image generation unit 105 may be synchronized with high precision.

(D) Fourth Other Configuration

Figure 24:
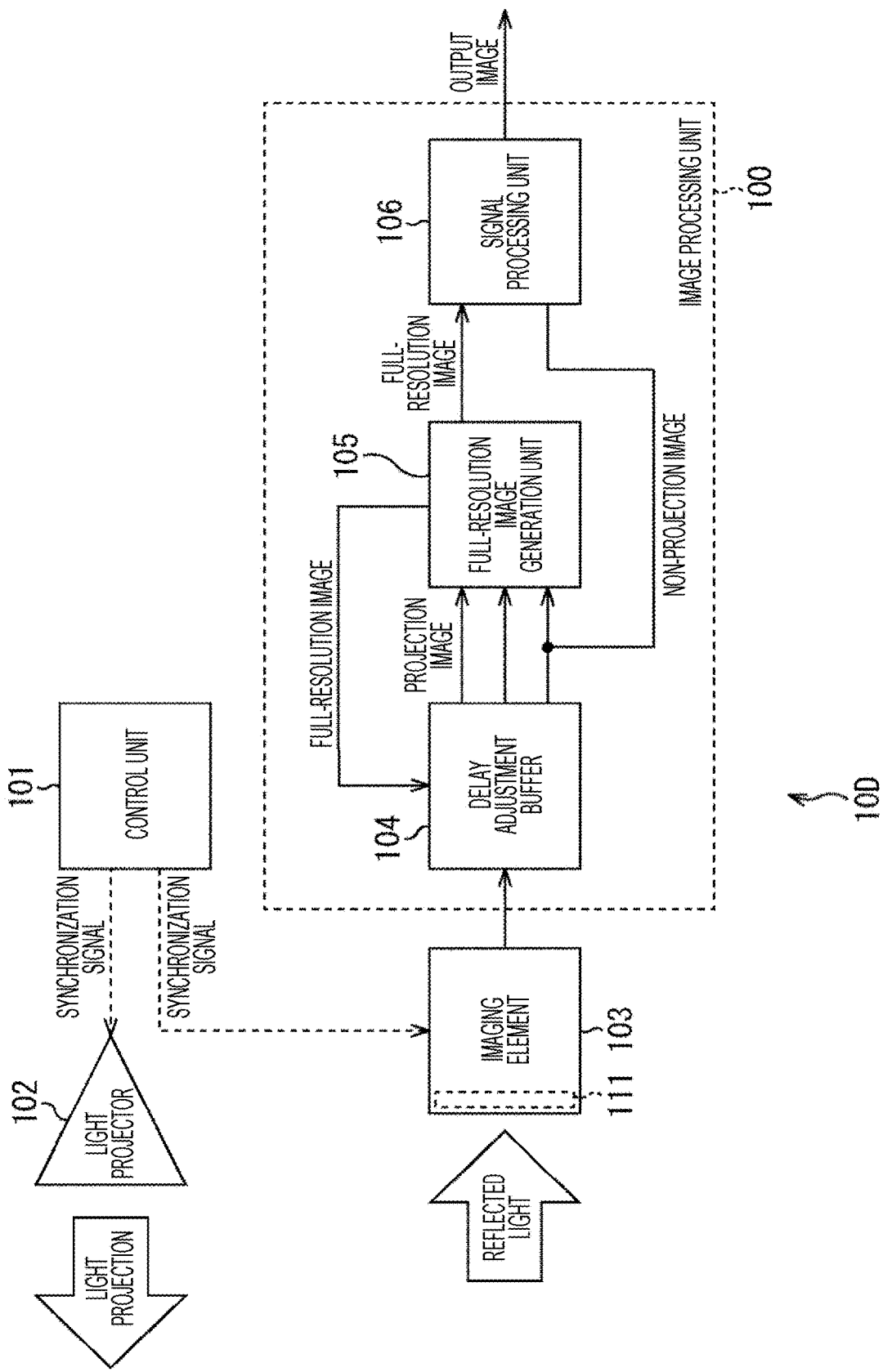
FIG. 24 is a view illustrating a fourth other configuration example of the imaging device.

FIG. 24 is a view illustrating a configuration example of an imaging device 10D. Meanwhile, in the imaging device 10D in FIG. 24, the same part as that of the imaging device 10 in FIG. 3 is assigned with the same reference sign, and the description thereof is appropriately omitted.

In FIG. 24, the imaging device 10D includes a control unit 101, a light projector 102, an imaging element 103, a delay adjustment buffer 104, a full-resolution image generation unit 105, and a signal processing unit 106.

That is, the imaging device 10D in FIG. 24 is different from the imaging device 10 in FIG. 3 in that a full-resolution image generated by the full-resolution image generation unit 105 is fed back to the delay adjustment buffer 104. In the full-resolution image generation unit 105, by reading out the full-resolution image (fed back) from the delay adjustment buffer 104 and processing the same, it is possible to improve precision of the full-resolution image generated thereafter.

As described above, in the imaging device 10D, it is possible to generate the full-resolution image with higher precision by using the full-resolution image which is fed back, so that it is possible to remove a false color and an artifact with higher precision.

(E) Fifth Other Configuration

Figure 25:
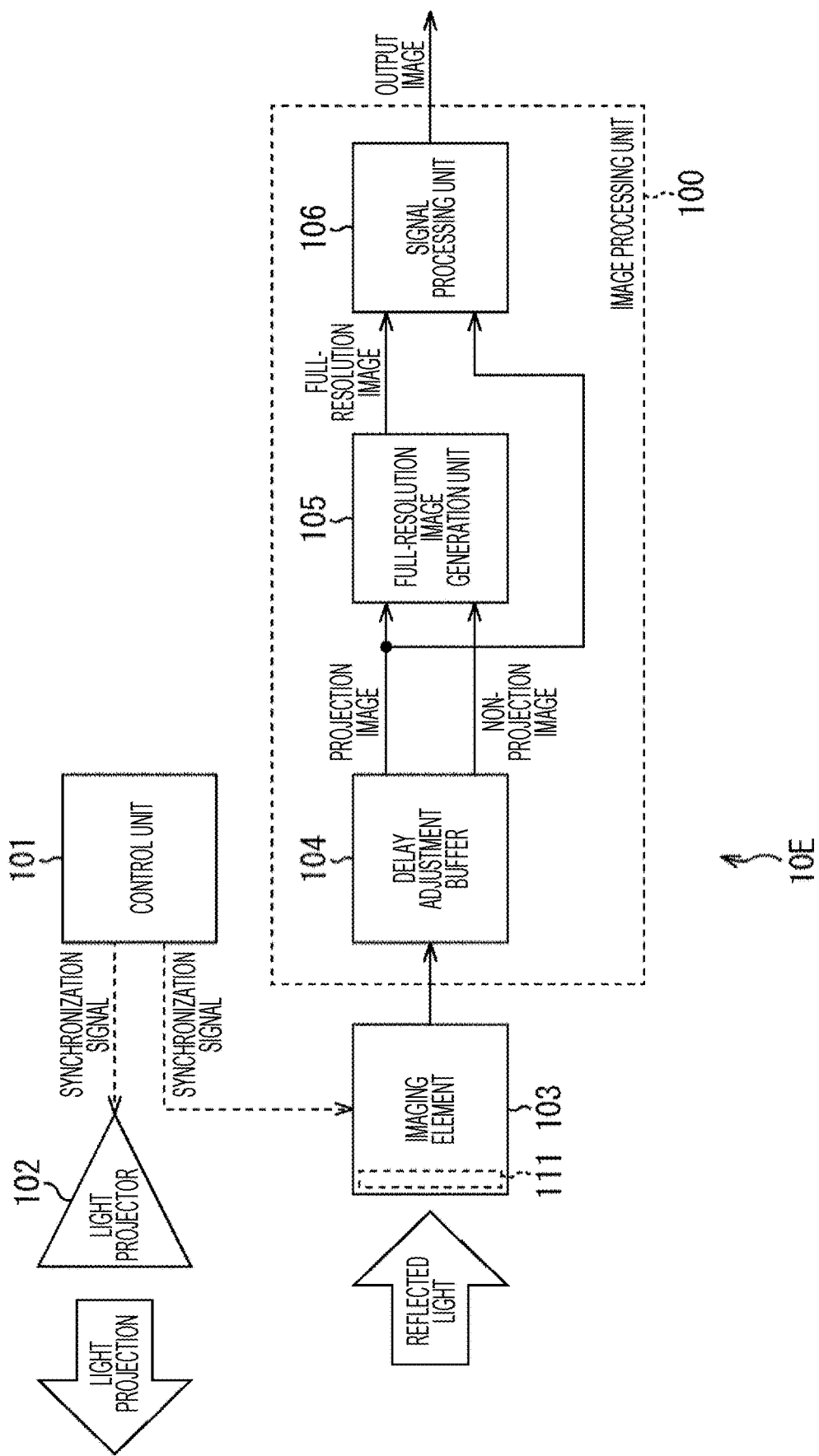
FIG. 25 is a view illustrating a fifth other configuration example of the imaging device.

FIG. 25 is a view illustrating a configuration example of an imaging device 10E. Meanwhile, in the imaging device 10E in FIG. 25, the same part as that of the imaging device 10 in FIG. 3 is assigned with the same reference sign, and the description thereof is appropriately omitted.

In FIG. 25, the imaging device 10E includes a control unit 101, a light projector 102, an imaging element 103, a delay adjustment buffer 104, a full-resolution image generation unit 105, and a signal processing unit 106.

That is, the imaging device 10E in FIG. 25 differs from the imaging device 10 in FIG. 3 in that a projection image is input to the signal processing unit 106 in place of a non-projection image. The signal processing unit 106 performs signal processing of processing the projection image read out from the delay adjustment buffer 104 by using a full-resolution image input from the full-resolution image generation unit 105. In this signal processing, for example, processing such as edge extraction processing and false color suppression processing using the full-resolution image is performed, and an output image is generated from the full-resolution image and the projection image.

As described above, in the imaging device 10E, the signal processing unit 106 performs the signal processing using the full-resolution image and the projection image to output the output image in which occurrence of false color or artifact is suppressed. Herein, by performing the edge extraction processing using the full-resolution image, the occurrence of the artifact is suppressed. Also, the occurrence of the false color is suppressed by performing the false color suppression processing using the full-resolution image.

(F) Other Configuration

Meanwhile, the variations of the imaging device 10 (FIG. 3) illustrated in FIGS. 21 to 25 are merely examples, and other configurations may also be adopted. For example, the light projector 102 and the imaging element 103 operate synchronously according to the synchronization signal from the control unit 101, but the wavelength of the light projected from the light projector 102 may be changed for each of the pixels arrayed in a two-dimensional lattice pattern in the imaging element 103. In this case, it is possible to switch on (turn-on) and off (turn-off) of the light projector 102 for each of the pixels. Also, in this case, the spectral characteristics on the invisible light side of the respective color filters (for example, R, G, B, and W filters) of the color filter 111 need not be uniform.

<5. Computer Configuration>

The above-described series of processes (image processing in FIG. 16) may be executed by hardware or may be executed by software. In a case where a series of processes is executed by the software, a program which forms the software is installed on a computer. Herein, the computer includes a computer built in dedicated hardware, a general-purpose personal computer, for example, capable of executing various functions by various programs installed and the like.

Figure 26:
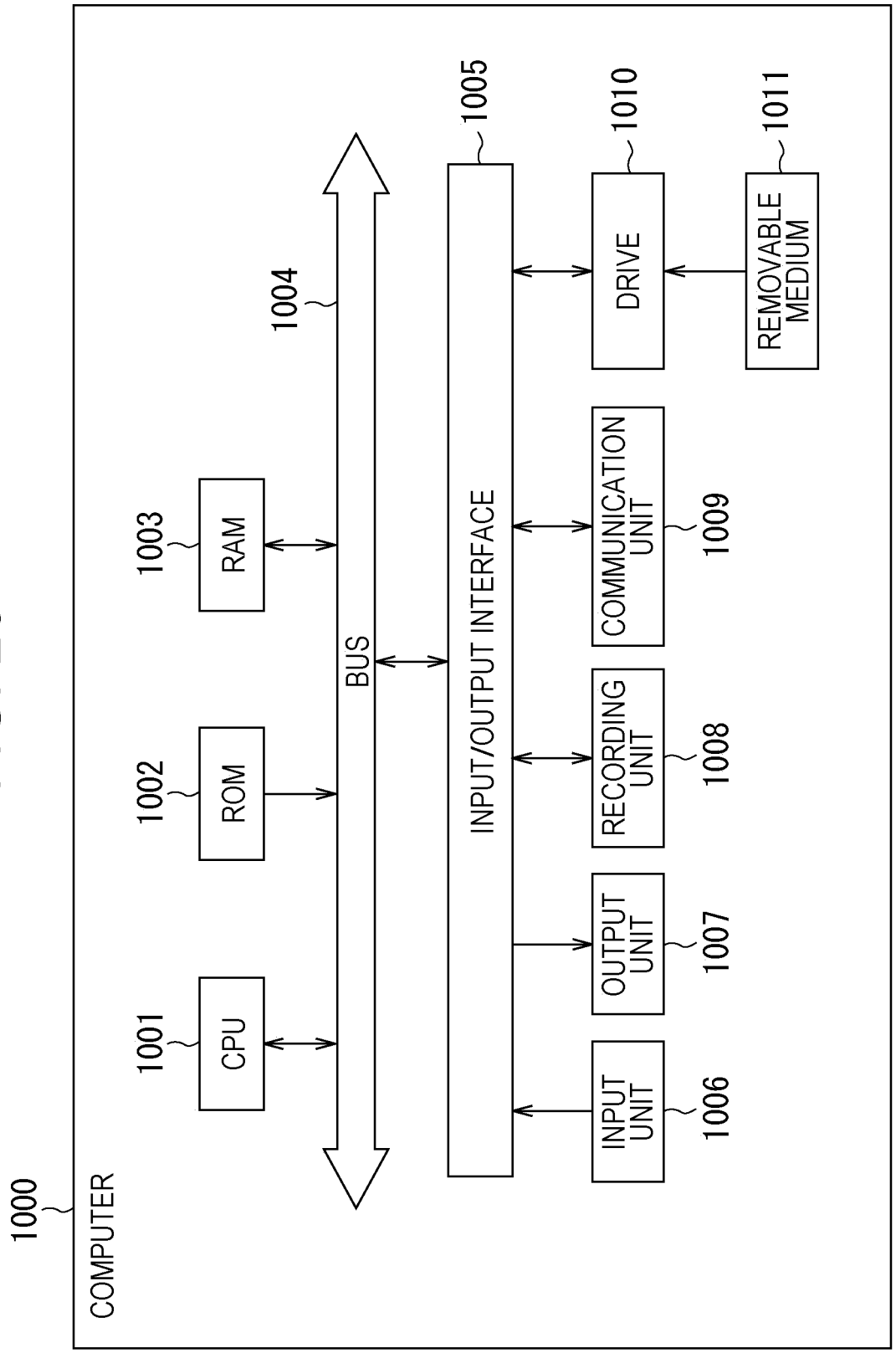
FIG. 26 is a view illustrating a configuration example of a computer.

FIG. 26 is a block diagram illustrating a configuration example of the hardware of the computer which executes the above-described series of processes by the program.

In a computer 1000, a central processing unit (CPU) 1001, a read only memory (ROM) 1002, and a random-access memory (RAM) 1003 are connected to one another through a bus 1004. An input/output interface 1005 is further connected to the bus 1004. An input unit 1006, an output unit 1007, a recording unit 1008, a communication unit 1009, and a drive 1010 are connected to the input/output interface 1005.

The input unit 1006 includes a keyboard, a mouse, a microphone and the like. The output unit 1007 includes a display, a speaker and the like. The recording unit 1008 includes a hard disk, a non-volatile memory and the like. The communication unit 1009 includes a network interface and the like. The drive 1010 drives a removable medium 1011 such as a magnetic disk, an optical disk, a magnetooptical disk, or a semiconductor memory.

In the computer 1000 configured in the above-described manner, the CPU 1001 loads the program stored in the recording unit 1008, for example, on the RAM 1003 through the input/output interface 1005 and the bus 1004 to execute, and as a result, the above-described series of processes is performed.

The program executed by the computer 1000 (CPU 1001) may be recorded on the removable medium 1011 as a package medium and the like to be provided, for example. Also, the program may be provided by means of a wired or wireless transmission medium such as a local area network, the Internet, and digital broadcasting.

In the computer 1000, the program may be installed on the recording unit 1008 through the input/output interface 1005 by mounting the removable medium 1011 on the drive 1010. Also, the program may be received by the communication unit 1009 via the wired or wireless transmission medium to be installed on the recording unit 1008. In addition, the program may be installed in advance on the ROM 1002 and the recording unit 1008.

Meanwhile, the program executed by the computer 1000 may be the program of which processes are performed in chronological order in the order described in this specification or may be the program of which processes are performed in parallel or at required timing such as when a call is issued.

Herein, in this specification, processing steps of describing the program for allowing the computer 1000 to perform various processes are not necessarily processed in chronological order according to the order described as the flowchart, and this also includes processes executed in parallel or individually (for example, parallel processing or processing by an object).

Also, the program may be processed by one computer or processed in a distributed manner by a plurality of computers. Furthermore, the program may be transmitted to a remote computer to be executed.

Furthermore, in this specification, the system is intended to mean assembly of a plurality of components (devices, modules (parts) and the like) and it does not matter whether all the components are in the same casing. Therefore, a plurality of devices stored in different casings connected through a network and one device obtained by storing a plurality of modules in one casing are the systems.

Meanwhile, the embodiments of the present technology are not limited to the above-described embodiments and various modifications may be made without departing from the scope of the present technology. For example, the present technology may be configured as cloud computing in which one function is shared by a plurality of devices through the network for processing in cooperation.

Meanwhile, the present technology may also have a following configuration.

(1)

An image processing device provided with:

an image generation unit which generates a high-resolution image obtained from a spectral component of a wavelength band of invisible light, the high-resolution image resolution of which is higher than resolution of an image of a subject obtained from a spectral component of a wavelength band of visible light on the basis of a projection image obtained by projecting light of the wavelength band of the invisible light to the subject.

(2)

The image processing device according to (1), in which a projection wavelength of the projected light includes a wavelength band corresponding to a spectral characteristic on an invisible light side of respective color filters of an imaging element which images the subject.

(3)

The image processing device according to (2), in which the image generation unit obtains a difference between a spectral component of the projection image and a spectral component of a non-projection image obtained when the light of the wavelength band of the invisible light is not projected, to generate the high-resolution image.

(4)

The image processing device according to (3), further provided with:

a signal processing unit which processes the projection image or the non-projection image on the basis of the generated high-resolution image to generate an output image.

(5)

The image processing device according to (4), in which the signal processing unit extracts edge information from the high-resolution image, generates a color image including a color component from the projection image or the non-projection image, removes a component of the invisible light from the color image, and combines the color image from which the component of the invisible light is removed with the edge information, to generate the output image.

(6)

The image processing device according to (5), in which the signal processing unit suppresses occurrence of a false color by processing the color image using the high-resolution image.

(7)

The image processing device according to (6), in which the signal processing unit estimates an amount of folding back occurring in the color image using the high-resolution image, and cancels the folding back occurring in the color image in accordance with an estimated amount of the folding back, to suppress the occurrence of the false color.

(8)

The image processing device according to any one of (3) to (7), in which the image generation unit corrects positional shift between the projection image and the non-projection image which should be processed simultaneously, and thereafter generates the high-resolution image according to a difference image obtained by the difference between the spectral component of the projection image and the spectral component of the non-projection image.

(9)

The image processing device according to (8), in which the image generation unit corrects deviation in spectral characteristic of the color filters by processing the difference image.

(10)

The image processing device according to (9), in which the image generation unit processes the difference image in which the deviation in spectral characteristic of the color filters is corrected and removes a pattern remaining in the difference image.

(11)

The image processing device according to any one of (8) to (10), further provided with:

a buffer which holds the projection image or the non-projection image and matches processing timings of the projection image and the non-projection image which should be processed simultaneously.

(12)

The image processing device according to any one of (1) to (11), in which the visible light includes light of components of red (R), green (G), and blue (B), and the invisible light is infrared light.

(13)
The image processing device according to (4),
in which the output image is a color image for viewing.
(14)
The image processing device according to (1),
in which the high-resolution image is a monochrome image for sensing.
(15)
An image processing method of an image processing device, provided with a step of:
generating a high-resolution image obtained from a spectral component of a wavelength band of invisible light, the high-resolution image resolution of which is higher than resolution of an image of a subject obtained from a spectral component of a wavelength band of visible light on the basis of a projection image obtained by projecting light of the wavelength band of the invisible light to the subject
by the image processing device.
(16)
An imaging device provided with:
an imaging element including color filters having a uniform spectral characteristic on an invisible light side of each color which images a subject;
a light projection unit which projects light of a projection wavelength including a wavelength band corresponding to the spectral characteristic on the invisible light side of the color filters to the subject; and
an image generation unit which generates a high-resolution image obtained from a spectral component of a wavelength band of the invisible light, the high-resolution image resolution of which is higher than resolution of an image of the subject obtained from a spectral component of a wavelength band of visible light on the basis of a projection image obtained by projecting the light of the projection wavelength to the subject.
(17)
The imaging device according to (16),
in which the image generation unit generates the high-resolution image by obtaining a difference between the spectral component of the projection image and a spectral component of a non-projection image obtained when the light of the wavelength band of the invisible light is not projected.
(18)
The imaging device according to (17), further provided with:
a signal processing unit which processes the projection image or the non-projection image on the basis of the generated high-resolution image to generate an output image.
(19)
The imaging device according to (18),
in which the signal processing unit
extracts edge information from the high-resolution image,
generates a color image including a color component from the projection image or the non-projection image,
removes a component of invisible light from the color image,
and combines the color image from which the component of the invisible light is removed with the edge information, to generate the output image.
(20)
The imaging device according to (19),
in which the signal processing unit suppresses occurrence of a false color by processing the color image using the high-resolution image.

REFERENCE SIGNS LIST 10, 10A to 10E Imaging device
100 Image processing unit
101 Control unit
102 Light projector
103, 103-1, 103-2 Imaging element
104 Delay adjustment buffer
105, 105A to 105C Full-resolution image generation unit
106 Signal processing unit
111, 111-1, 111-2 Color filter
112 IR cut filter
121 Difference processing unit
122 Color filter-specific sensitivity deviation correction unit
123 Remaining pattern removal filter
124 Positional shift correction processing unit
141 Edge extraction unit
142 Color synchronization unit
143 False color suppression unit
144 Invisible light component removal unit
145 Edge combining unit
146 Camera signal processing unit
1000 Computer
1001 CPU

The invention claimed is:

1. An image processing device, comprising:
an image generation unit configured to:
correct positional shift between a projection image and a non-projection image, wherein the projection image and the non-projection image are concurrently processed;
obtain, based on the corrected positional shift, a difference image based on a difference between a spectral component of the projection image and a spectral component of the non-projection image; and
generate, based on the obtained difference image, a high-resolution image obtained from a spectral component of a wavelength band of invisible light, wherein
a resolution of the high-resolution image is higher than a resolution of an image of a subject,
the image of the subject is obtained from a spectral component of a wavelength band of visible light based on the projection image,
the projection image is obtained based on projection of light of the wavelength band of the invisible light to the subject,
a projection wavelength of the projected light includes the wavelength band that corresponds to a spectral characteristic on an invisible light side of respective color filters of an imaging element,
the imaging element generates the image of the subject, and
the non-projection image is obtained based on light of the wavelength band of the invisible light is not projected.

2. The image processing device according to claim 1, further comprising a signal processing unit configured to:
process the non-projection image based on the high-resolution image; and
generate, based on the processed non-projection image, an output image.

3. The image processing device according to claim 2, wherein the signal processing unit is further configured to:
extract edge information from the high-resolution image;
generate a color image including a color component from the non-projection image;

remove a component of the invisible light from the color image to generate a new color image;
combine the new color image and the edge information; and
generate, based on the combined new color image and the edge information, the output image.

4. The image processing device according to claim 3, wherein the signal processing unit is further configured to:
process the color image based on the high-resolution image; and
suppress occurrence of a false color based on the processed color image.

5. The image processing device according to claim 4, wherein the signal processing unit is further configured to:
estimate, based on the high-resolution image, an amount of folding back that occurs in the color image;
cancel, based on the estimated amount of the folding back, the folding back that occurs in the color image; and
suppress, based on the cancellation of the folding back, the occurrence of the false color.

6. The image processing device according to claim 2, wherein the output image is a color image for a viewing process.

7. The image processing device according to claim 1, wherein the image generation unit is further configured to:
process the difference image; and
correct, based on the processed difference image, deviation in the spectral characteristic of the respective color filters.

8. The image processing device according to claim 7, wherein the image generation unit is further configured to remove a pattern from the difference image.

9. The image processing device according to claim 1, further comprising a buffer configured to:
hold the projection image and the non-projection image; and
match a processing timing of the projection image and a processing timing of the non-projection image.

10. The image processing device according to claim 1, wherein
the visible light includes light of components of red (R), green (G), and blue (B), and
the invisible light is infrared light.

11. The image processing device according to claim 1, wherein the high-resolution image is a monochrome image for a sensing process.

12. An image processing method, comprising:
in an image processing device:
correcting positional shift between a projection image and a non-projection image, wherein the projection image and the non-projection image are concurrently processed;
obtaining, based on the corrected positional shift, a difference image based on a difference between a spectral component of the projection image and a spectral component of the non-projection image; and
generating, based on the obtained difference image, a high-resolution image that is obtained from a spectral component of a wavelength band of invisible light, wherein
a resolution of the high-resolution image is higher than a resolution of an image of a subject,
the image of the subject is obtained from a spectral component of a wavelength band of visible light based on the projection image,
the projection image is obtained based on projection of light of the wavelength band of the invisible light to the subject,
a projection wavelength of the projected light includes the wavelength band that corresponds to a spectral characteristic on an invisible light side of respective color filters of an imaging element,
the imaging element generates the image of the subject, and
the non-projection image is obtained based on light of the wavelength band of the invisible light is not projected.

13. An imaging device, comprising:
an imaging element configured to generate an image of a subject, wherein the imaging element includes color filters having a uniform spectral characteristic on an invisible light side of each color of a plurality of colors;
a light projection unit configured to project light to the subject, wherein a projection wavelength of the projected light includes a wavelength band corresponding to the uniform spectral characteristic on the invisible light side of the color filters; and
an image generation unit configured to:
correct positional shift between a projection image and a non-projection image, wherein the projection image and the non-projection image are concurrently processed;
obtain, based on the corrected positional shift, a difference image based on a difference between a spectral component of the projection image and a spectral component of the non-projection image; and
generate, based on the obtained difference image, a high-resolution image obtained from a spectral component of a wavelength band of invisible light, wherein
a resolution of the high-resolution image is higher than a resolution of the image of the subject,
the image of the subject is obtained from a spectral component of a wavelength band of visible light based on the projection image,
the projection image is obtained based on the projected light of the projection wavelength to the subject, and
the non-projection image is obtained based on light of the wavelength band of the invisible light is not projected.

14. The imaging device according to claim 13, further comprising a signal processing unit configured to:
process the non-projection image based on the high-resolution image; and
generate, based on the processed non-projection image, an output image.

15. The imaging device according to claim 14, wherein the signal processing unit is further configured to:
extract edge information from the high-resolution image;
generate color image including a color component from the non-projection image;
remove a component of invisible light from the color image to generate a new color image;
combine the new color image and the edge information; and
generate, based on the combined new color image and the edge information, the output image.

16. The imaging device according to claim 15, wherein the signal processing unit is further configured to:
process the color image based on the high-resolution image; and suppress occurrence of a false color based on the processed color image.

17. An image processing device, comprising:

an image generation unit configured to:
- obtain a difference between a spectral component of a projection image and a spectral component of a non-projection image;
- generate, based on the obtained difference, a high-resolution image that is obtained from a spectral component of a wavelength band of invisible light, wherein
  - a resolution of the high-resolution image is higher than a resolution of an image of a subject,
  - the image of the subject is obtained from a spectral component of a wavelength band of visible light based on the projection image,
  - the projection image is obtained based on projection of light of the wavelength band of the invisible light to the subject,
  - a projection wavelength of the projected light includes the wavelength band that corresponds to a spectral characteristic on an invisible light side of respective color filters of an imaging element,
  - the imaging element generates the image of the subject, and
  - the non-projection image is obtained based on light of the wavelength band of the invisible light is not projected; and a signal processing unit configured to:
- extract edge information from the high-resolution image;
- generate a color image including a color component from the non-projection image;
- remove a component of the invisible light from the color image to generate a new color image;
- combine the new color image and the edge information; and
- generate, based on the combined new color image and the edge information, an output image.

18. An imaging device, comprising:

an imaging element configured to generate an image of a subject, wherein the imaging element includes color filters having a uniform spectral characteristic on an invisible light side of each color of a plurality of colors;

a light projection unit configured to project light to the subject, wherein a projection wavelength of the projected light includes a wavelength band corresponding to the uniform spectral characteristic on the invisible light side of the color filters;

an image generation unit configured to:
- obtain a difference between a spectral component of a projection image and a spectral component of a non-projection image;
- generate, based on the obtained difference, a high-resolution image that is obtained from a spectral component of a wavelength band of invisible light, wherein
  - a resolution of the high-resolution image is higher than a resolution of the image of the subject,
  - the image of the subject is obtained from a spectral component of a wavelength band of visible light based on the projection image,
  - the projection image is obtained based on the projected light of the projection wavelength to the subject, and
  - the non-projection image is obtained based on light of the wavelength band of the invisible light is not projected; and a signal processing unit configured to:
- extract edge information from the high-resolution image;
- generate a color image including a color component from the non-projection image;
- remove a component of the invisible light from the color image to generate a new color image;
- combine the new color image and the edge information; and
- generate, based on the combined new color image and the edge information, an output image.

* * * * *